United States Patent
Honoki et al.

(10) Patent No.: US 12,235,105 B2
(45) Date of Patent: Feb. 25, 2025

(54) TECHNIQUE FOR SETTING LASER MARKER INOPERABLE

(71) Applicant: MAKITA CORPORATION, Anjo (JP)

(72) Inventors: Manami Honoki, Anjo (JP); Yoichiro Koike, Anjo (JP); Masafumi Noda, Anjo (JP)

(73) Assignee: MAKITA CORPORATION, Anjo (JP)

(*) Notice: Subject to any disclaimer, the term of this patent is extended or adjusted under 35 U.S.C. 154(b) by 775 days.

(21) Appl. No.: 17/364,506

(22) Filed: Jun. 30, 2021

(65) Prior Publication Data

US 2022/0003549 A1    Jan. 6, 2022

(30) Foreign Application Priority Data

Jul. 1, 2020  (JP) ................ 2020-114358

(51) Int. Cl.
  *G01C 15/00* (2006.01)
  *G01C 15/06* (2006.01)
  *G06F 21/44* (2013.01)
  *H04W 4/80* (2018.01)

(52) U.S. Cl.
  CPC .......... *G01C 15/004* (2013.01); *G01C 15/06* (2013.01); *G06F 21/44* (2013.01); *H04W 4/80* (2018.02); *G06F 2221/2137* (2013.01)

(58) Field of Classification Search
  CPC ...... G01C 15/004; G01C 15/06; G01C 15/02; G06F 21/44; G06F 2221/2137; H04W 4/80

See application file for complete search history.

(56) References Cited

U.S. PATENT DOCUMENTS

| | | | | |
|---|---|---|---|---|
| 6,087,645 A | * | 7/2000 | Kitajima | G01B 11/26 250/203.1 |
| 6,938,350 B1 | * | 9/2005 | Hersey | G01C 15/004 33/286 |
| 7,350,303 B2 | * | 4/2008 | Rock | G01C 1/00 33/366.11 |
| 7,395,604 B2 | * | 7/2008 | Chien | G01C 15/004 33/290 |

(Continued)

FOREIGN PATENT DOCUMENTS

| | | |
|---|---|---|
| JP | H06-065818 U | 9/1994 |
| JP | 2006-250611 A | 9/2006 |

(Continued)

OTHER PUBLICATIONS

Dec. 12, 2023 Office Action issued in Japanese Patent Application No. 2020-114358.

*Primary Examiner* — Yaritza Guadalupe-McCall
(74) *Attorney, Agent, or Firm* — Oliff PLC

(57) ABSTRACT

A laser marker according to one aspect of the present disclosure includes: a laser emitter; an information reception circuit; a measuring circuit; and a disabling circuit. The measuring circuit starts to measure an elapsed time in response to the information reception circuit receiving an enabled time. The disabling circuit disables the laser marker for operating in response to a length of the elapsed time reaching or having reached a length of the enabled time.

9 Claims, 24 Drawing Sheets

(56) References Cited

U.S. PATENT DOCUMENTS

| | | | |
|---|---|---|---|
| 7,497,018 B2* | 3/2009 | Hersey | G01C 15/004 33/286 |
| 7,861,427 B2* | 1/2011 | Schumacher | G01C 15/004 33/282 |
| 2010/0064534 A1* | 3/2010 | Schumacher | G01C 15/004 33/290 |
| 2021/0195423 A1 | 6/2021 | Goto | |
| 2022/0003546 A1* | 1/2022 | Honoki | G01C 9/06 |
| 2022/0003549 A1* | 1/2022 | Honoki | G01C 15/004 |
| 2022/0134999 A1 | 5/2022 | Nakashima et al. | |

FOREIGN PATENT DOCUMENTS

| | | |
|---|---|---|
| JP | 6647509 B1 | 2/2020 |
| JP | 2020043545 A | 3/2020 |

* cited by examiner

TECHNIQUE FOR SETTING LASER MARKER INOPERABLE

CROSS-REFERENCE TO RELATED APPLICATION

The present application claims the benefit of Japanese Patent Application No. 2020-114358 filed on Jul. 1, 2020 with the Japan Patent Office, the entire disclosure of which is incorporated herein by reference.

BACKGROUND

The present disclosure relates to a technique for setting a laser marker inoperable.

Japanese Unexamined Patent Application Publication No. 2006-250611 discloses a laser marker provided with a key switch. The key switch has a key plate.

The laser marker is configured not to emit laser beam if the key plate is removed from the key switch. Theft of the laser marker can be deterred by removal of the key plate since the laser marker without the key plate is valueless to steal.

SUMMARY

The aforementioned laser marker requires a user to move to the laser marker to remove the key plate. In addition, the removal of the key plate from the laser marker causes a change in an installation position of the laser marker.

If the installation position is changed, the user is required to put the laser marker in position again before resuming using the laser marker, which may bother the user.

It is preferable that one aspect of the present disclosure can reduce a workload required for a user to set a laser marker inoperable.

A laser marker (or a laser level, or a laser leveling device) according to one aspect of the present disclosure includes a laser emitter. The laser emitter emits a laser beam. The laser beam indicates a reference line.

The laser marker includes an information reception circuit. The information reception circuit receives an enabled time via a wireless communicator. The enabled time specifies a time-period during which the laser marker is enabled to operate. The enabled time is a variable.

The laser marker includes a measuring circuit. The measuring circuit starts to measure an elapsed time in response to the information reception circuit receiving the enabled time. The laser marker includes a disabling circuit. The disabling circuit disables the laser marker for operating in response to a length of the elapsed time reaching or having reached (or exceeding or having exceeded) a length of the enabled time. The elapsed time is a variable.

The laser marker is disabled for operating in response to the length of the elapsed time reaching or having reached the length of the enabled time. Therefore, the laser marker does not require the user to move thereto in order to disable the operation of the laser marker. Furthermore, the laser marker does not require the user to touch the laser marker in order to disable the laser marker from operating, and thus no change occurs in an installation position of the laser marker.

Accordingly, the laser marker can reduce a workload required for the user to set the laser marker inoperable (or inoperative).

In the laser marker according to the present disclosure, the laser emitter, the information reception circuit, the measuring circuit, or the disabling circuit may be removed from the laser marker.

The disabling circuit may enable the laser marker to operate in response to the length of the elapsed time not reaching nor having reached (or not exceeding nor having exceeded) the length of the enabled time. In this way, the laser marker can operate by a time when the length of the elapsed time reaches the length of the enabled time.

The laser marker may include an authentication code storage device. The authentication code storage device may be configured to store a first authentication code. Alternatively, the authentication code storage device may be storing the first authentication code. The first authentication code may be assigned to the laser marker. The first authentication code may include a string of characters, numbers, and/or symbols for enabling a use of the laser marker.

The laser marker may include an authentication circuit. The authentication circuit may authenticate, based on the first authentication code, an external device that is connected to the laser marker via the wireless communicator.

The information reception circuit may receive a second authentication code from the external device via the wireless communicator. The second authentication code may be inputted into the external device by a user of the external device.

The authentication circuit may permit the external device to transmit the enabled time to the laser marker in response to the second authentication code corresponding to the first authentication code. The authentication circuit may prohibit the external device from transmitting the enabled time to the laser marker in response to the second authentication code not corresponding to the first authentication code.

The laser marker permits the external device to transmit the enabled time in response to the received second authentication code corresponding to the first authentication code. The laser marker can limit the operation of the laser marker based on the enabled time, and thus can deter theft of the laser marker. The laser marker prohibits the external device from transmitting the enabled time in response to the second authentication code not corresponding to the first authentication code. Thus, the laser marker does not limit the operation of the laser marker based on the enabled time, whereby the laser marker becomes operable.

Additionally, the authentication circuit may notify, in response to the second authentication code not corresponding to the first authentication code, that the second authentication code does not correspond to the first authentication code.

The laser marker may include an enabled time storage device. The enabled time storage device may be configured to store the enabled time that is received by the information reception circuit.

The enabled time storage device may update the enabled time that has been stored in the enabled time storage device, in response to the information reception circuit receiving the enabled time, with the enabled time received. The disabling circuit may determine whether the length of the elapsed time is reaching or has reached the length of the enabled time based on the enabled time having been stored in the enabled time storage device.

The laser marker can update the enabled time in accordance with situational changes, during the measurement of the elapsed time. In the laser marker configured as such, it is possible to appropriately change the enabled time depending on the situational changes.

The laser marker may include a motor. The motor may generate a rotational force. The laser emitter may be directly or indirectly rotatably coupled to the motor to be rotated by the motor.

The laser beam may include a horizontal laser beam or a vertical laser beam. The horizontal laser beam indicates a horizontal reference line. The vertical laser beam indicates a vertical reference line. The laser marker configured as such can indicate the horizontal reference line or the vertical reference line.

A portable terminal device according to another aspect of the present disclosure includes a wireless communication circuit.

The wireless communication circuit may wirelessly communicate with a laser marker.

The portable terminal device includes an information receiving circuit. The information receiving circuit may receive an enabled time from a user of the portable terminal device. The enabled time specifies a time-period during which the laser marker is enabled to operate.

The portable terminal device includes an information transmission circuit. The information transmission circuit may transmit the enabled time to the laser marker via the wireless communication circuit.

The portable terminal device can set the enabled time into the laser marker via a wireless communication. The portable terminal device configured as such does not require the user to touch the laser marker to set the laser marker inoperable. Consequently, the portable terminal device can reduce the workload for the user. In the portable terminal device according to the present disclosure, the wireless communication circuit, the information receiving circuit, or the information transmission circuit may be removed from the portable terminal device.

The laser marker may be provided with a first authentication code assigned thereto for enabling a use of the laser marker. The information receiving circuit may receive a second authentication code from the user of the portable terminal device. The second authentication code may include an authentication code that is inputted by the user of the portable terminal device. The second authentication code may correspond to the first authentication code. The first authentication code may include a string of characters, numbers, and/or symbols.

The information transmission circuit may transmit the second authentication code to the laser marker via the wireless communication circuit.

The portable terminal device can transmit the second authentication code to the laser marker via a wireless communication. Therefore, the portable terminal device does not require the user to touch the laser marker in order to input the second authentication code into the laser marker. Consequently, the portable terminal device can reduce the workload for the user.

The information receiving circuit may receive a contact information request command from the user of the portable terminal device. The contact information request command may request to display a contact information of at least one service provider. The at least one service provider may provide a service related to the laser marker. Examples of the at least one service provider include: a manufacturer; a repairer; a retailer; a service office; and a customer support center.

The portable terminal device may include a contact information display. The contact information display may display the contact information in response to the information receiving circuit receiving the contact information request command.

For example, when the laser marker is disabled for operation, the contact information of the at least one service provider, such as an address and a telephone number, may be displayed. In this way, the user of the portable terminal device can inquire of the at least one service provider about a method for setting the laser marker operable.

The portable terminal device may include a service provider specifying circuit. The service provider specifying circuit may specify a first service provider based on a database. The database may include addresses and/or names of service providers. The first service provider may be the closest to a current location of the portable terminal device.

The portable terminal device may include a service provider displaying circuit. The service provider displaying circuit may display a name of the first service provider.

The portable terminal device configured as such can notify the user thereof of the first service provider.

The information receiving circuit may be configured to receive a request from the user of the portable terminal device. The service provider displaying circuit may display a detailed information of the first service provider in accordance with the request from the user. The detailed information may be selected in accordance with the request from the user of the portable terminal device.

The portable terminal device configured as such can provide the user thereof with the detailed information desired by the user. The detailed information may include a contact information of the first service provider. The contact information may include the address or the telephone number of the first service provider. The database may include the telephone number of the first service provider.

The service provider specifying circuit may be configured to specify a second service provider based on the database. The second service provider is the second closest to the current location of the portable terminal device. The service provider displaying circuit may be configured to display the second service provider's name.

The portable terminal device configured as such can notify the user thereof of the second service provider.

Yet another aspect of the present disclosure provides a method for setting an enabled time into a laser marker, comprising:

receiving the enabled time in an external device, the enabled time specifying a time-period during which the laser marker is enabled to operate; and transmitting the enabled time from the external device to the laser marker via a wireless communication.

According to the method, the operation of the laser marker can be limited based on the enabled time, and thus theft of the laser marker can be deterred.

Yet another aspect of the present disclosure provides a method for providing a computer of a portable terminal device with a computer program, the method comprising:

transmitting the computer program to the portable terminal device in response to the portable terminal device requesting for the computer program, the computer program including a sequence of instructions to make the computer perform:

(i) receiving an enabled time from a user of the portable terminal device, the enabled time specifying a time-period during which a laser marker is enabled to operate, and (ii) transmitting the enabled time to the laser marker.

According to the method, the operation of the laser marker can be limited based on the enabled time, and thus theft of the laser marker can be reduced.

A portable terminal device according to yet another aspect of the present disclosure comprising:

a communication circuit configured to perform a wireless communication;

a display; and a computer configured to execute a process including;

specifying a first service provider based on a database, the database including names and addresses of service providers including a first service provider, the first service provider being the closest to a current location of the portable terminal device, and displaying a name and/or an address of the first service provider on the display.

The process may further include, specifying a second service provider based on the database, the second service provider being the second closest to the current location of the portable terminal device.

An electric work system according to yet another aspect of the present disclosure includes the above-described laser marker and the above-described portable terminal device.

The electric work system can set the laser marker "enabled" or "disabled" for operation via a wireless communication with the portable terminal device. The electric work system configured as such can reduce a workload for a user thereof to set the laser marker inoperable.

A computer program according to yet another aspect of the present disclosure makes a computer execute a wireless communication step, an information receiving step, and an information transmission step.

In the wireless communication step, the computer performs wireless communications with a laser marker, to thereby transmit and/or receive various information to/from the laser marker. The laser marker includes an electric-driven circuit configured to operate by electricity. In the information receiving step, the computer receives a permission signal from a user thereof. The permission signal includes an enabled time during which the laser marker is enabled to operate. In the information transmission step, the computer outputs the permission signal to the laser marker through the wireless communication step. The electric-driven circuit may include a motor and/or a laser emitter. The motor may generate a rotational force. The laser emitter may emit a laser beam.

This computer program makes the computer function as the above-described portable terminal device. The program configured as such can reduce the workload for the user to set the laser marker inoperable.

The above-described computer may be a generally-known computer, or a computer configured as a portable terminal device. The above-described computer may be a so-called mobile phone, a smartphone, or a tablet device.

The above-described computer program may be stored in either a ROM or a backup RAM that is built into a computer, and loaded into the computer from the ROM or the backup ROM, or may be loaded into the computer through a network. The above-described computer program may be an application program installed in a smartphone or the like.

The above-described computer program may be stored in a storage medium in any computer-readable form. Examples of the storage medium include a portable semiconductor memory (for example, a USB memory, or a memory card (Registered Trademark)), and the like.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

It should be noted that the present disclosure is not limited to the embodiment below and may be practiced in various forms as long as it falls within the technical scope of the present disclosure.

1. First Embodiment 1-1. Overall Configuration 1-1-1. System

Figure 1:
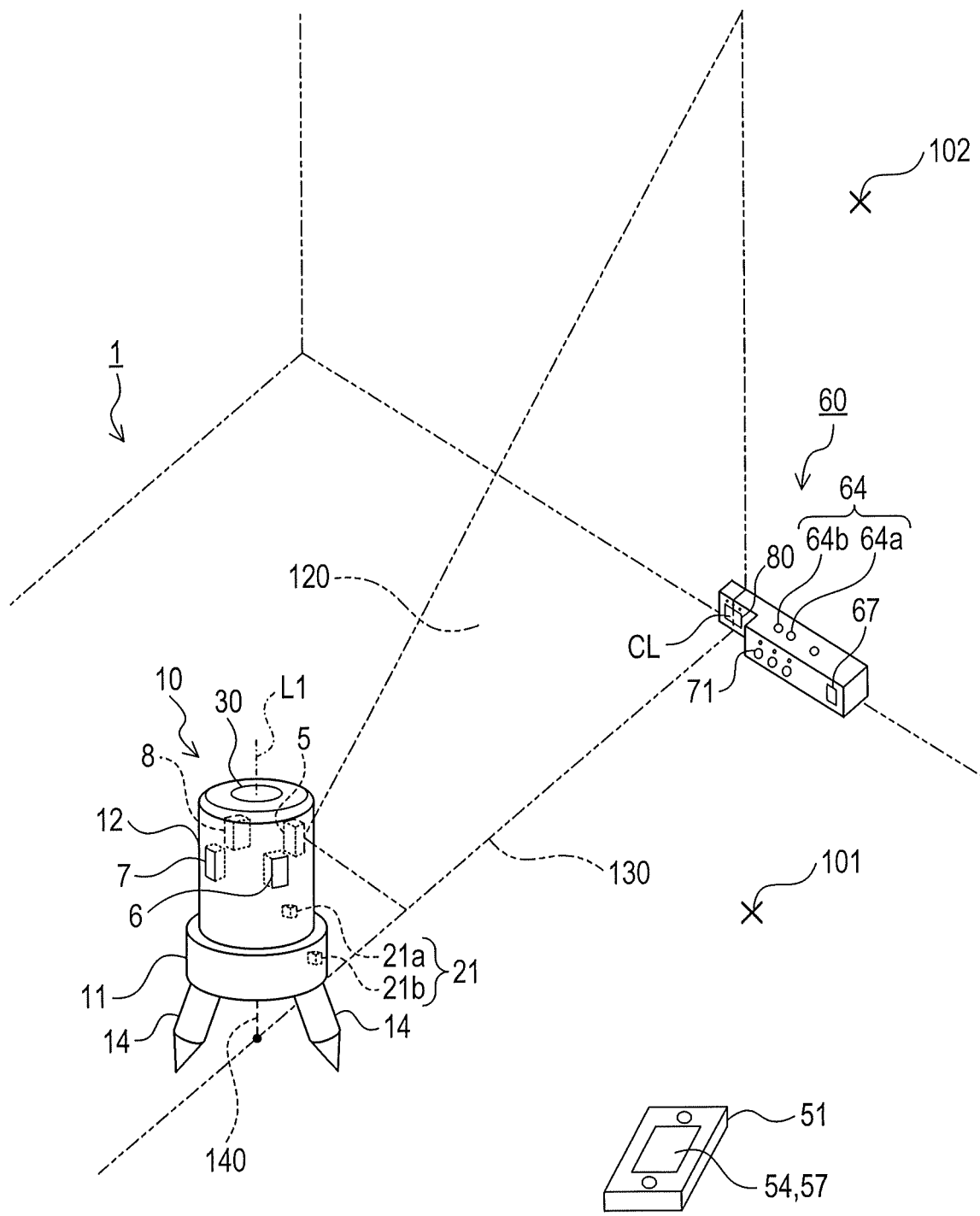
FIG. 1 is an explanatory diagram showing an electric work system.

As shown in FIG. 1, an electric work system 1 according to a first embodiment includes: a laser marker 10; a portable terminal device 51; and a beam receiving device 60. In another embodiment, the portable terminal device 51 or the beam receiving device 60 may be removed from the electric work system 1.

The laser marker 10 is used, for example, in civil engineering or construction works. The laser marker 10 projects a laser beam onto an object. The projected laser beam indicates a reference line.

The electric work system 1 is configured such that the portable terminal device 51 or the beam receiving device 60 controls a rotation of the laser marker 10, specifically a position of the laser beam, at a position distanced from the laser marker 10.

1-1-2. Laser Marker

The laser marker 10 includes a support body 11 and a rotation body 12. The support body 11 includes legs 14. In the present embodiment, the support body 11 includes three legs 14. The support body 11 is supported by the legs 14 on a floor 101. Hereinafter, the floor 101 or a surface other than the floor 101, on which the laser marker 10 is placed, is also referred to as a placement surface.

The rotation body 12 is configured to rotate about a center axis L1 with respect to the support body 11. In FIG. 1, the laser marker 10 is placed such that the center axis L1 is vertical to the placement surface.

The rotation body 12 is formed into substantially a cylindrical shape and extends along the center axis L1. The rotation body 12 includes a first emitter 5, a second emitter 6, a third emitter 7, and a fourth emitter 8. The first to the fourth emitters 5 to 8 each emit a laser beam outward of the laser marker 10. The rotation body 12 includes, in its upper surface, a user interface 30.

Figure 2:
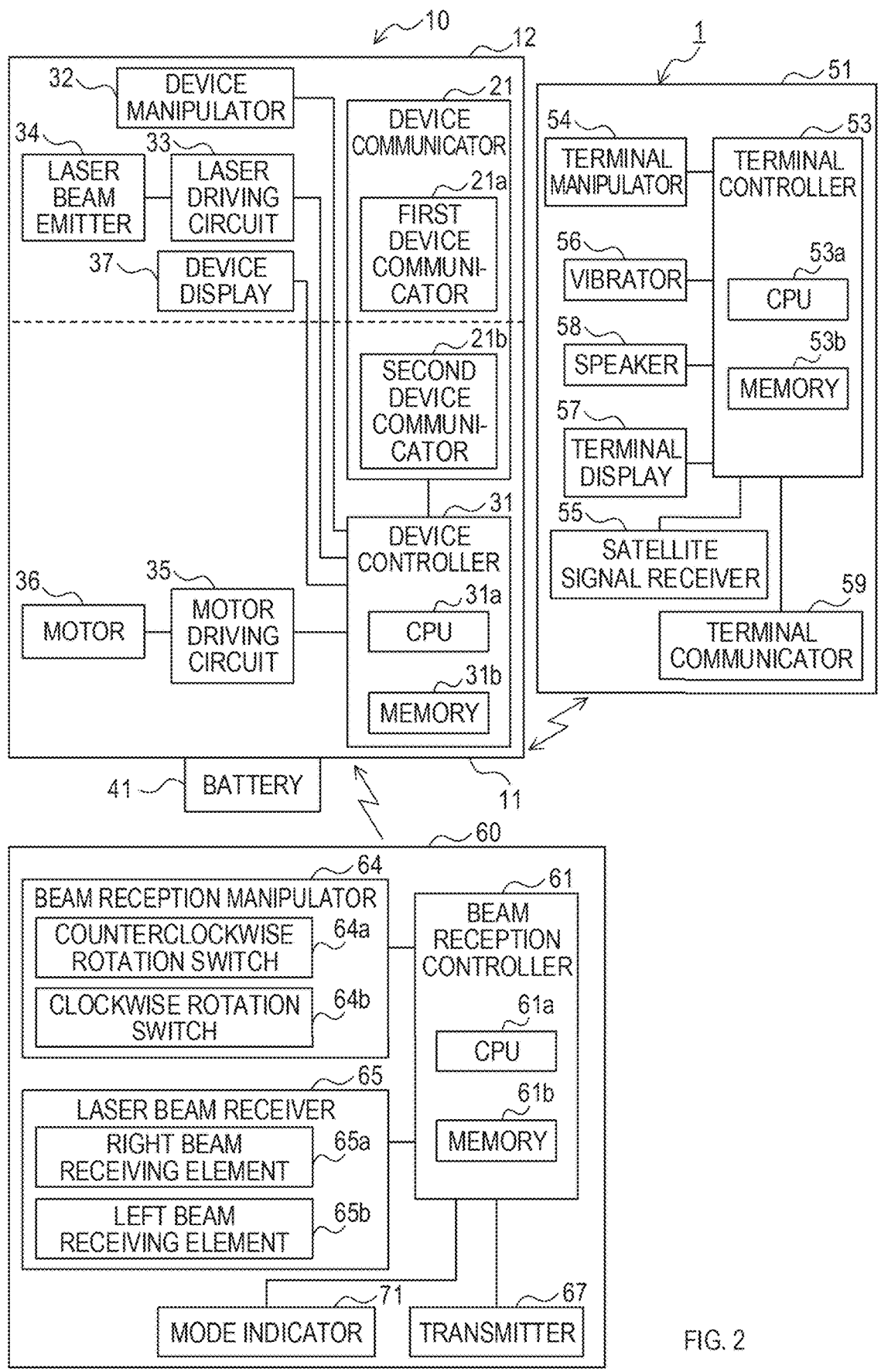
FIG. 2 is an explanatory diagram showing an electrical configuration of the electric work system.

The first to the fourth emitters 5 to 8 are arranged at a specified interval (for example, at a 90 degrees interval) along a circumferential direction of the rotation body 12. The first to the fourth emitters 5 to 8 each include a laser beam emitter 34 (see. FIG. 2). The laser beam emitter 34 generates the laser beam. The laser beam emitter 34 may include various kinds of laser beam emitting elements. For example, the laser beam emitter 34 may include a semiconductor laser, a gas laser, and/or a solid-state laser. The laser beam emitter 34 may be configured to generate the laser beam with another technique. The laser beam emitter 34 is configured to polarize the laser beam in a vertical direction, to thereby emit a vertical laser beam 120 outward of the laser marker 10. The vertical laser beam 120 indicates a vertical reference line.

The rotation body 12 may include a fifth emitter in addition to the first to the fourth emitters 5 to 8. The fifth emitter emits a horizontal laser beam outward of the rotation body 12. The horizontal laser beam indicates a horizontal reference line. The rotation body 12 may include at least one additional emitter besides the fifth emitter, in accordance with a beam divergence of the horizontal laser beam. The at least one additional emitter emits a horizontal laser beam. If each horizontal laser beam has a beam divergence of 110 degrees and the rotation body 12 includes the fifth emitter and three additional emitters, the rotation body 12 can emit four horizontal laser beams that overlap with one another, ranging 360 degrees (the full sphere).

In FIG. 1, the vertical laser beam 120 is emitted across a range from the floor 101 to a wall surface 102. The vertical laser beam 120 is emitted from the first emitter 5 of the laser marker 10, which is placed on the floor 101. Furthermore, in FIG. 1, the vertical laser beam 120 is emitted along a ground marker line 130. The laser marker 10 may emit a downward laser beam 140 toward a lower side of the center axis L1 (in other words, a direction toward the placement surface). The ground marker line 130 is provided on the floor 101.

The laser marker 10 includes a device communicator 21. As shown in FIG. 2, the device communicator 21 includes a first device communicator 21a and a second device communicator 21b. The first device communicator 21a performs a wireless communication in accordance with a first communication protocol (or method) (hereinafter, referred to as a first wireless communication). The second device communicator 21b performs a wireless communication in accordance with a second communication protocol (or method) (hereinafter, referred to as a second wireless communication). The second communication protocol is distinct from the first communication protocol. The first device communicator 21a is provided to the rotation body 12. The second device communicator 21b is provided to the support body 11.

The first device communicator 21a and the second device communicator 21b may be provided at positions other than those described above. For example, both the first device communicator 21a and the second device communicator 21b may be provided to the support body 11. Both the first device communicator 21a and the second device communicator 21b may be provided to the rotary body 12.

The first device communicator 21a transmits and receives various information to and from the portable terminal device 51. The second device communicator 21b receives a signal transmitted from the beam receiving device 60. The first communication protocol includes a near field wireless communication protocol. The near field wireless communication protocol is, for example, a protocol that conforms to a standard for Bluetooth. Bluetooth is a registered trademark. The second communication protocol is, for example, a protocol that confirms to a standard for infrared communication protocol. In the present embodiment, Bluetooth is used as the first communication protocol and an infrared communication protocol is used as the second communication protocol.

The second device communicator 21b receives an infrared light transmitted from the beam receiving device 60 and photoelectrically converts the infrared light, to thereby extract a remote-controlling signal from the infrared light. The second device communicator 21b transmits the extracted remote-controlling signal into the support body 11.

In another embodiment, the second device communicator 21b may be removed from the device communicator 21. In other words, the device communicator 21 may include only the first device communicator 21a. In this case, the second communication protocol conforms to the same communication standard as the first communication protocol and is applied with a modulation that is distinct from a modulation in the first communication protocol. Alternately, in another embodiment, the first device communicator 21a may be removed from the device communicator 21 instead of the second device communicator 21b.

1-1-3. Portable Terminal Device

The portable terminal device 51 includes a function to remotely manipulate the laser marker 10 through a wireless communication. For example, the portable terminal device 51 includes a remote rotation function, a remote laser control function, and an auto-lock function.

In the remote rotation function, the laser marker 10 (specifically, the rotation body 12) is rotated. In the remote laser control function, the four emitters 5, 6, 7 and 8 of the laser marker 10 are controlled. In the auto-lock function, if a difference between an elapsed time and an enabled time satisfies a predefined enabling criterion, an operation of the laser marker 10 is enabled, and if the difference does not satisfy the predefined enabling criterion, the operation of the laser marker 10 is disabled.

The portable terminal device 51 includes a terminal communicator 59 (see, FIG. 2). The terminal communicator 59 performs the first wireless communication with the first device communicator 21a of the laser marker 10, to thereby transmit and receive various information to and from the first device communicator 21a. The terminal communicator 59 transmits, for example, a device manipulation signal. The device manipulation signal corresponds to a signal for remotely manipulating the laser marker 10. The terminal communicator 59 receives, for example, a device information signal. The device information signal corresponds to a signal of indicating information related to the laser marker 10.

1-1-4. Beam Receiver

The beam receiving device 60 includes a function to remotely manipulate the laser marker 10 through a wireless communication. The beam receiving device 60 includes, for example, a remote rotation function and a remote laser control function.

The beam receiving device 60 includes a transmitter 67 and a laser beam receiving window 80. The transmitter 67 performs the second wireless communication with the second device communicator 21b of the laser marker 10, to thereby transmit the remote-controlling signal to the second device communicator 21b. The remote-controlling signal corresponds to a signal for remotely manipulating the laser marker 10.

The laser beam receiving window 80 has a rectangular shape. The laser beam receiving window 80 is configured to allow incidence of the vertical laser beam 120 from the laser marker 10 into the beam receiving device 60. In response to the vertical laser beam 120 entering or having entered the laser beam receiving window 80, the laser beam receiver 65 (see, FIG. 2) receives the vertical laser beam 120.

The laser beam receiver 65 is arranged inside the beam receiving device 60. The laser beam receiver 65 is configured into a rectangular shape. The laser beam receiver 65 includes a right beam receiving element 65a and a left beam receiving element 65b. The right beam receiving element 65a and the left beam receiving element 65b may be of the same kind, such as a light receiving diode. The right beam receiving element 65a is arranged rightward of a center line CL. The left beam receiving element 65b is arranged leftward of the center line CL. The center line CL corresponds to the center line of the laser beam receiving window 80 and the laser beam receiver 65 in a horizontal direction. The right beam receiving element 65a and the left beam receiving element 65b are in contact with each other on the center line CL.

The beam receiving device 60 is placed on the placement surface such that the center line CL is aligned with the ground marker line 130. When an amount of light received on a right side is greater than an amount of light received on a left side in the beam receiving device 60, the vertical laser beam 120 deviates rightward of the center. The amount of light received on the right side corresponds to an amount of light received by the right beam receiving element 65a. The amount of light received on the left side corresponds to an amount of light received by the left beam receiving element 65b. When the respective amounts of light received on the right side and the left side are equal to each other, the vertical laser beam 120 is located at the center. In other words, the vertical laser beam 120 is aligned with the ground marker line 130. When the amount of light received on the right side is less than the amount of light received on the left side, the vertical laser beam 120 deviates leftward of the center.

1-2. Electrical Configuration

1-2-1. Laser Marker

Descriptions are given of an electrical configuration of the electric work system 1 with reference to FIG. 2.

The laser marker 10 includes the device communicator 21, a device controller 31, a device manipulator 32, a laser driving circuit 33, the laser beam emitter 34, a motor driving circuit 35, a motor 36, a device display 37, and a battery 41. In another embodiment, at least one of the device communicator 21, the device controller 31, the device manipulator 32, the laser driving circuit 33, the laser beam emitter 34, the motor driving circuit 35, the motor 36, the device display 37, or the battery 41 may be removed from the laser marker 10. As described above, the device communicator 21 includes the first device communicator 21a and the second device communicator 21b.

Figure 3:
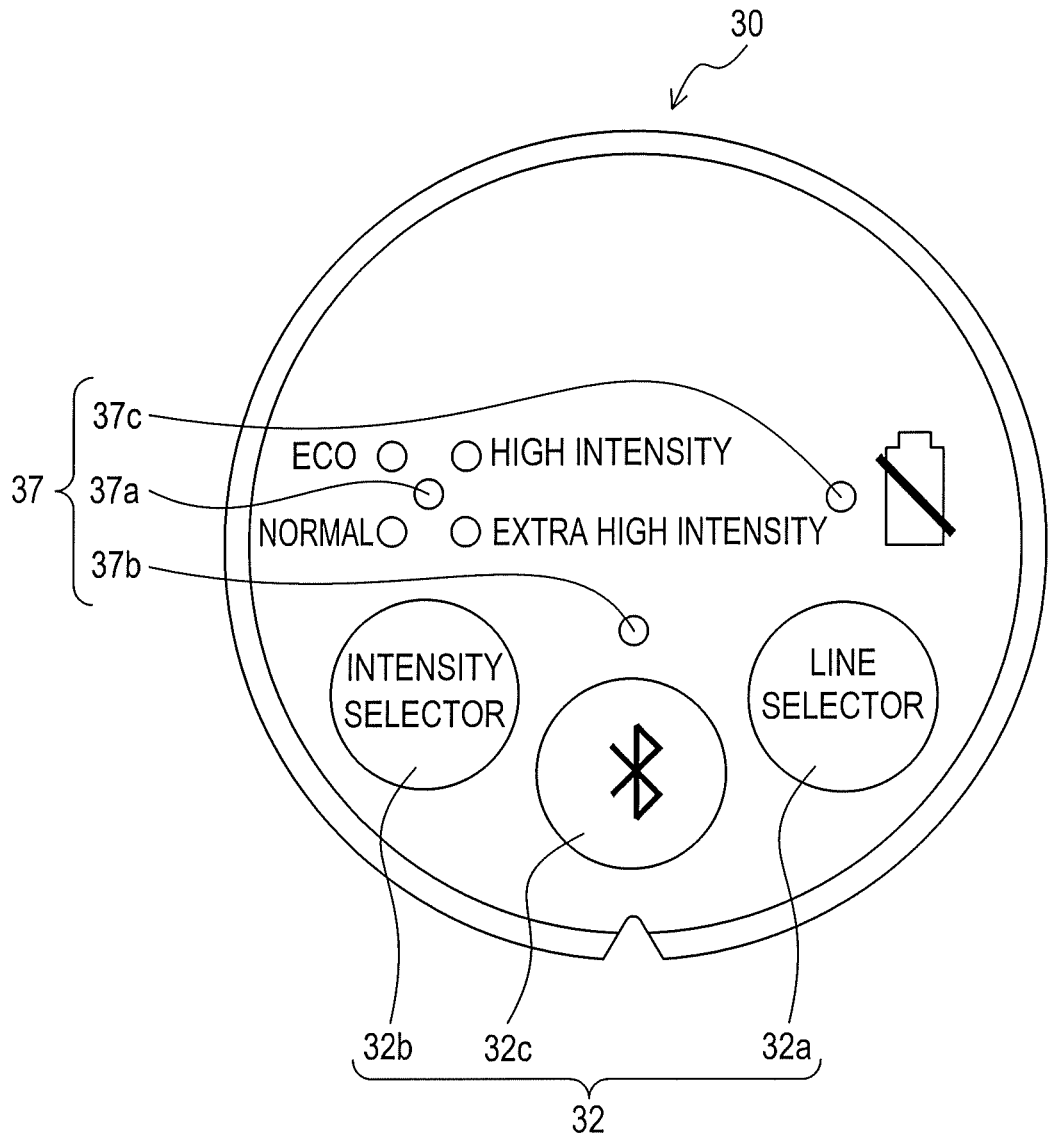
FIG. 3 is an explanatory diagram showing a user interface.

The second device communicator 21b, the device controller 31, the motor drive circuit 35, and the motor 36 are provided to the support body 11 of the laser marker 10. The first device communicator 21a, the device manipulator 32, the laser driving circuit 33, the laser beam emitter 34, and the device display 37 are provided to the rotation body 12 of the laser marker 10. As shown in FIG. 3, the device manipulator 32 and the device display 37 are provided to the user interface 30.

The device controller 31 includes a CPU 31a, a memory 31b, an input/output (I/O) port, and the like. The memory 31b includes a ROM, a RAM, and the like. The device controller 31 may be, for example, in the form of a microcomputer. The CPU 31a executes various programs stored in the memory 31b, whereby the device controller 31 achieves functions.

As shown in FIG. 3, the device manipulator 32 includes a line selection manipulator 32a, an intensity selection manipulator 32b, and a wireless communication manipulator 32c. In another embodiment, at least one of the line selection manipulator 32a, the intensity selection manipulator 32b, or the wireless communication manipulator 32c may be removed from the device manipulator 32.

The laser marker 10 includes a first to a third lighting modes. The line selection manipulator 32a is a switch to select one of the lighting modes of the laser marker 10. In the first lighting mode, only the first emitter 5 may be turned on. In the second lighting mode, both the second emitter 6 and the fourth emitter 8 may be turned on. In the third lighting mode, all the emitters from the first to the fourth emitters 5 to 8 may be turned on. In another embodiment, at least one additional lighting mode may be provided. Furthermore, at least one of the first to the third lighting modes may be removed. The first to the fourth emitters 5 to 8 may be turned on in any manner. The laser marker 10 switches various kinds of lighting mode in a specified order every time the line selection manipulator 32a is manipulated.

The laser marker 10 includes four kinds of intensity mode. The four kinds of intensity mode have respective different brightness of the laser beam emitted from the laser marker 10. The intensity selection manipulator 32b is a switch to select one of the intensity modes. The four kinds of intensity mode include, for example, an eco-mode, a normal mode, a high intensity mode, and an extra high intensity mode.

The wireless communication manipulator 32c is a switch to connect the laser marker 10 to the portable terminal device 51 through the first wireless communication. The first device communicator 21a is configured to establish a communication path of the first wireless communication between the laser marker 10 and the portable terminal device 51, which exists within a wireless communication area, in response to the wireless communication manipulator 32c being manipulated or having been manipulated. The wireless communication area corresponds to a wirelessly-communicable area for the first device communicator 21a.

The laser driving circuit 33 causes the laser beam emitter 34 to emit the laser beam with a pulse drive. The pulse drive allows the vertical laser beam 120 to be emitted in an intermittent manner, not in a continuous manner. The laser driving circuit 33 causes the laser beam emitter 34 to emit the laser beam in a constant cycle at a specified duty ratio. A cycle of the pulse drive may be appropriately determined. In the present embodiment, the cycle of the pulse drive is set to the extent (for example, 0.2 msec or less) an afterimage effect allows the user to visually perceive the vertical laser beam 120 as being continuously emitted.

The laser beam emitter 34 is provided in a corresponding manner to each of the emitters 5, 6, 7 and 8. The laser beam emitter 34 includes a laser diode that emits a laser beam.

The motor driving circuit 35 drives the motor 36. The motor driving circuit 35 may be in the form of a H-bridge circuit in one example. The motor drive circuit 35 controls a driving current flowing through the motor 36 based on a drive signal output from the device controller 31.

The motor 36 may be, for example, in the form of a DC brushed motor. The motor 36 generates a driving force to rotate the rotation body 12 of the laser marker 10. The laser marker 10 may include an additional motor to generate an additional driving force in addition to the driving force required for a rotational motion of the rotation body 12. The motor 36 may be in the form of a three-phase brushless motor or a stepper motor.

The device display 37 shows a state of the laser marker 10. As shown in FIG. 3, the device display 37 includes an intensity display 37a, a wireless communication display 37b, and a battery state display 37c. In another embodiment, at least one of the intensity display 37a, the wireless communication display 37b, or the battery state display 37c may be removed from the device display 37.

The intensity display 37a lights on in green in the eco-mode, lights off in the normal mode, lights on in orange in the high intensity mode, and lights on in red in the extra intensity mode. The wireless communication display 37b lights on in response to the laser marker 10 being wirelessly connected to the portable terminal device 51 after the wireless communication manipulator 32c is turned on. The wireless communication display 37b blinks in response to the laser marker 10 being wirelessly unconnected to the portable terminal device 51 after the wireless communication manipulator 32c is turned on. The wireless communication display 37b lights off in response to the wireless communication manipulator 32c being turned off. The battery state display 37c lights on when a remaining electric energy of the battery 41 is below a specified threshold, and lights off when the remaining electric energy is above the threshold.

The battery 41 is a power source to supply an electric power to the laser marker 10. The battery 41 is detachably attached to the laser marker 10. The battery 41 includes a rechargeable battery. When the remaining electric energy of the battery 41 decreases, the battery 41 is replaced with another battery, whereby the laser marker 10 can operate continuously. The battery 41 may include a non-rechargeable battery in addition to or in replacement of the rechargeable battery.

1-2-2. Portable Terminal Device

The portable terminal device 51 includes a terminal controller 53, a terminal manipulator 54, a satellite signal receiver 55, a vibrator 56, a terminal display 57, a speaker 58, and the terminal communicator 59. In another embodiment, at least one of the terminal controller 53, the terminal manipulator 54, the vibrator 56, the terminal display 57, the speaker 58, or the terminal communicator 59 may be removed from the portable terminal device 51.

The terminal controller 53 includes a CPU 53a, a memory 53b, an I/O port, and the like. The terminal controller 53 may be, for example, in the form of a microcomputer. The CPU 53a executes various programs stored in the memory 53b, whereby the terminal controller 53 achieves functions.

The CPU 53a may be configured to execute a program code encoded in a tangible computer readable medium. The computer readable medium refers to any medium that can provide the portable terminal device 51 with a data to operate the portable terminal device 51 in a specified method. Various computer readable mediums may be used to provide the CPU 53a with a command to be executed by the CPU 53a. A general type of the computer readable medium includes, for example, a magnetic medium, an optical medium, a physical medium, a memory chip or a memory cartridge, a carrier wave, and any other computer readable mediums. The computer readable medium may be a volatile medium, a non-volatile medium, or a transmission medium. The volatile medium and the non-volatile medium may utilize by any method or technique to store information (for example, a computer readable command, a data structure, a program module, or other data described in details below). The transmission medium may be a coaxial cable, a copper wire, and/or an optical fiber cable, and a sound wave or an electromagnetic wave (including a radio wave and an optical wave). The tangible computer readable storage medium may be, for example, an integrated circuit (for example, a field programmable gate array or an application specific IC), a hard disc, an optical disc, an optical magnetic disc, a floppy disc, a magnetic tape, a holographic memory medium, a solid state device, a RAM, a ROM, an electrically erasable programmable read-only memory (EEPROM), a flash memory or other memory technology, a CD-ROM, a digital versatile disc (DVD) or other optical storages, and a magnetic tape in cassette form, a magnetic tape, a magnetic disc memory or other magnetic storages.

The terminal manipulator 54 includes a touch screen. The touch screen is configured such that the user directly touches the touch screen with a finger or a thumb, to thereby perform an input manipulation. The touch screen transmits a signal to the terminal controller 53 in accordance with the input manipulation by the user.

The satellite signal receiver 55 receives signals for navigation that are transmitted from satellites in a satellite navigation system, such as the United States' Global Positioning System (GPS), Russia's Global Navigation Satellite System (GLONASS), China's BeiDou Navigation Satellite System (BDS), European Union's Galileo, Japan's Quasi-Zenith Satellite System (QZSS), Indian Regional Navigation Satellite System (IRNSS), or the like, or any combination thereof.

The terminal display 57 includes a display panel. The display panel provides an image in accordance with a display command signal from the terminal controller 53. The display panel may be, for example, in the form of a liquid crystal panel or an organic electroluminescence (EL) panel.

The terminal manipulator 54 and the terminal display 57 may include a liquid crystal display (LCD) with a touch screen or an organic EL display with a touch screen.

The vibrator 56 outputs a vibration in accordance with a vibration output command signal from the terminal controller 53. The vibrator 56 is configured to output various types of vibration patterns, and outputs a vibration in accordance with the vibration output command signal.

The speaker 58 outputs a buzzing sound, a voice, or music in accordance with a sound output command signal from the terminal controller 53. The speaker 58 is configured to output various types buzzing sounds, which are varied by pattern of sound, and outputs a buzzing sound in accordance with the sound output command signal. The speaker 58 outputs a buzzer, a voice, or music in accordance with the sound output command signal from the terminal controller 53.

The portable terminal device 51 is configured such that the user can set an output limitation on the vibrator 56 and/or the speaker 58. The output limitation is set by, for example, the user selecting a vibration mode or a silent mode. In response to the user setting the output limitation in the portable terminal device 51, an output from the speaker 58 and/or the vibrator 56 is set to be suspended (or stopped). In the present embodiment, in response to the portable terminal device 51 being set or having set to the vibration mode, the output from the speaker 58 is set to be suspended.

1-2-3. Beam Receiving Device

The beam receiving device 60 includes a beam reception controller 61, a beam reception manipulator 64, the laser beam receiver 65, the transmitter 67, and a mode indicator 71. In another embodiment, at least one of the beam reception controller 61, the beam reception manipulator 64, the laser beam receiver 65, the transmitter 67, or the mode indicator 71 may be removed from the beam receiving device 60.

The beam reception controller 61 includes a CPU 61a, a memory 61b, an I/O port, and the like. The beam reception controller 61 may be, for example, in the form of a microcomputer. The CPU 61a executes various programs stored in the memory 61b, whereby the beam reception controller 61 achieves functions.

The beam reception manipulator 64 includes a counterclockwise rotation switch 64a and a clockwise rotation switch 64b. In another embodiment, the counterclockwise rotation switch 64a or the clockwise rotation switch 64b may be removed from the beam reception manipulator 64. The counterclockwise rotation switch 64a rotates the rotation body 12 counterclockwise in the remote-controlled mode. The clockwise rotation switch 64b rotates the rotation body 12 clockwise in the remote-controlled mode.

In response to receipt of the laser beam, the laser beam receiver 65 transmits a beam reception signal to the beam reception controller 61. Specifically, the laser beam receiver 65 transmits the beam reception signal to the beam reception controller 61 in response to the vertical laser beam 120 entering or having entered the laser beam receiving window 80.

The mode indicator 71 includes a light emitting diode (LED). The mode indicator 71 is switched between light-on/light-off in accordance with an operation mode of the beam receiving device 60. The beam receiving device 60 is configured to be switched between the remote-controlled mode or the automatic tracking mode. When the operation mode is set to the automatic tracking mode, the beam reception controller 61 causes the mode indicator 71 light on, and, when the operation mode is set to the remote-controlled mode, the beam reception controller 61 causes the mode indicator 71 light off.

1-3. Processes

Descriptions will be given of various processes executed by the electric work system 1.

A process concerning the auto-lock function and a process concerning an information display will be described. In the following descriptions, the process concerning the auto-lock function will be also referred to as an auto-lock process. In the following descriptions, the process concerning the information display will be also referred to as an information display process.

The auto-lock process enables the laser marker 10 to operate until the elapsed time exceeds (or reaches) the enabled time (or a length of the elapsed time exceeds a length of the enabled time), and disables an operation of the laser marker 10 when the elapsed time exceeds (or reaches) the enabled time. The enabled time is set by the user. The user can set the enabled time via the portable terminal device 51.

The auto-lock process is executed in a state where the laser marker 10 and the portable terminal device 51 are connected via the first wireless communication. The auto-lock process is executed through cooperation between the device controller 31 of the laser marker 10 and the terminal controller 53 of the portable terminal device 51. Examples of the auto-lock process include: an auto-lock activation process; a displayed remaining time update process; an enabled time setup process; and a password change process.

Figure 4A:
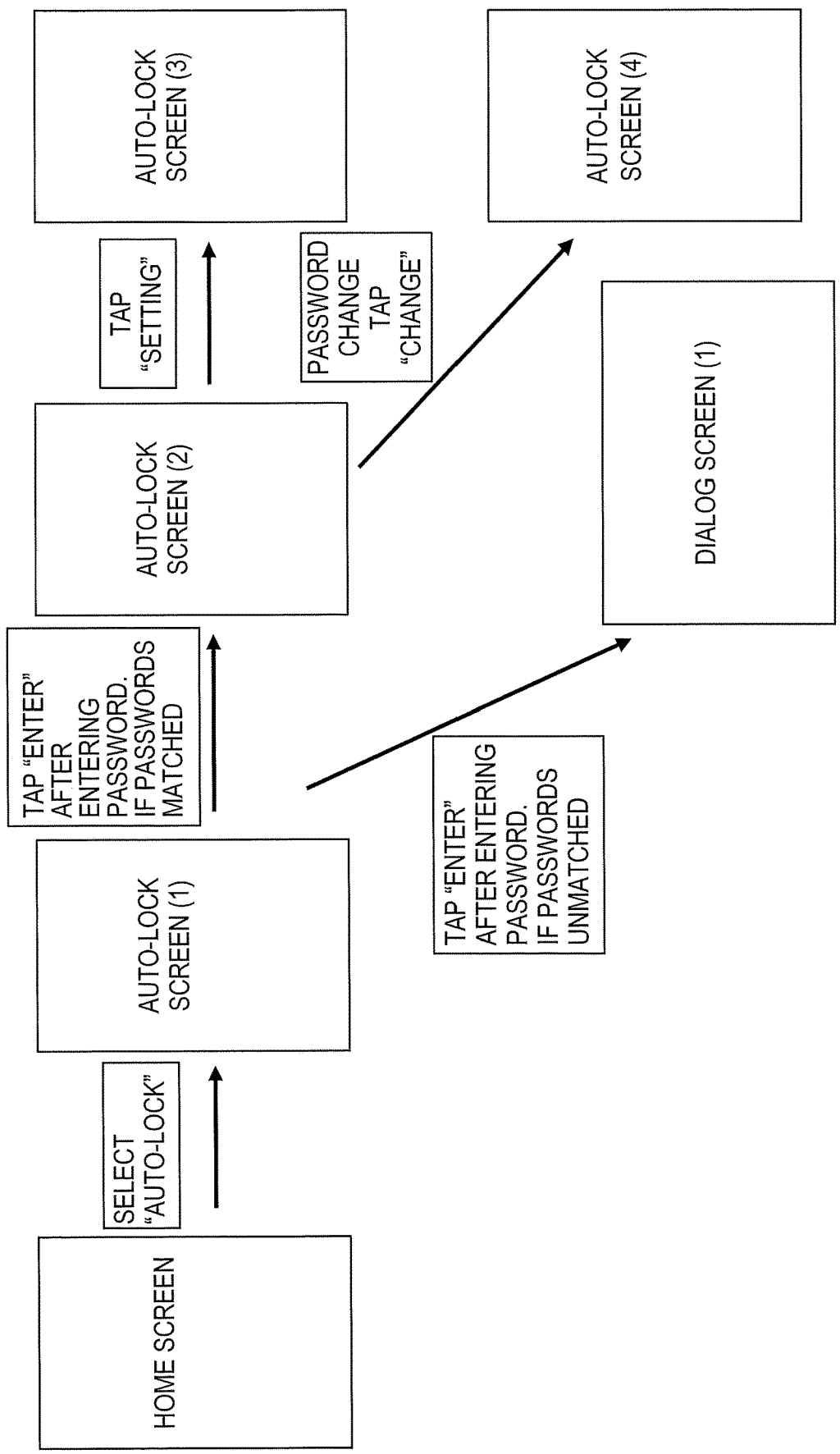
FIG. 4A is an explanatory diagram showing a screen transition from a home screen to auto-lock screens.
Figure 4B:
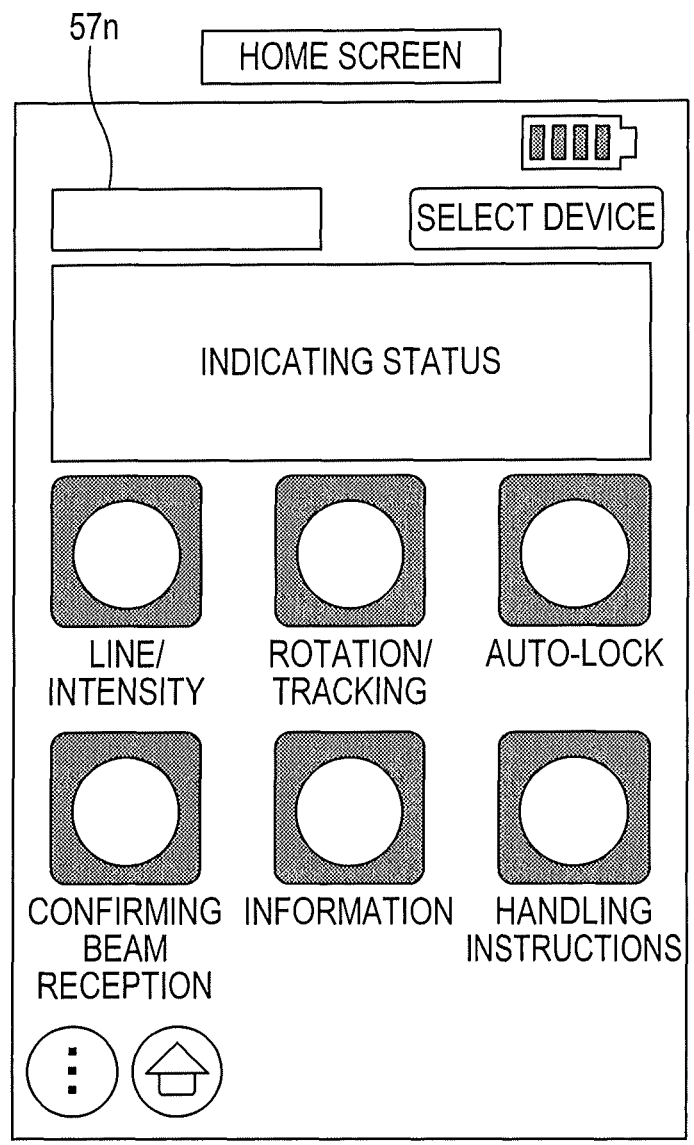
FIG. 4B is an explanatory diagram of the home screen.

The auto-lock process is executed when the user selects (or taps) an "auto-lock" button on a home screen (see, FIG. 4B) displayed on the terminal display 57 of the portable terminal device 51. The terminal display 57 displays during execution of the auto-lock process the home screen and auto-lock screens (1) to (4) as shown by a screen transition in FIG. 4A.

The information display process is a process to display various information on the portable terminal device 51. Examples of the information display process include a service office display process, and the like.

Figure 5A:
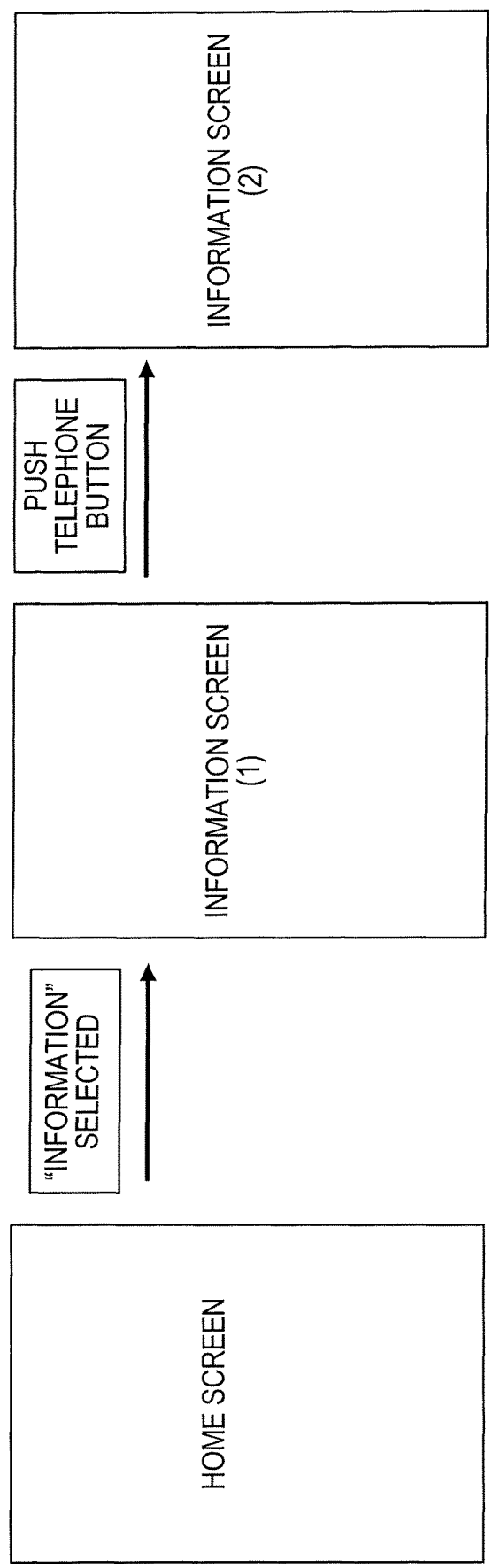
FIG. 5A is an explanatory diagram showing a screen transition from the home screen to information screens.

The information display process is executed when the user selects (or taps) an "information" button on the home screen (see, FIG. 4B) displayed on the terminal display 57 of the portable terminal device 51. The terminal display 57 displays during execution of the information display process the home screen and information screens (1) and (2) as shown by a screen transition in FIG. 5A.

The home screen, the auto-lock screens (1) to (4) and the information screens (1) to (2) each include a device name display field 57n. The device name display field 57n displays a name of a device that is wirelessly connected with the portable terminal device 51 (hereinafter, to be also referred to as a connected device) and such. Examples of the connected device include the laser marker 10 and the like. The device name display field 57n may display not only a name of such a device but also information, such as a device's model number or a device's model name, for the user to identify the connected device.

1-3-1. Auto-Lock Activation Process

Figure 6:
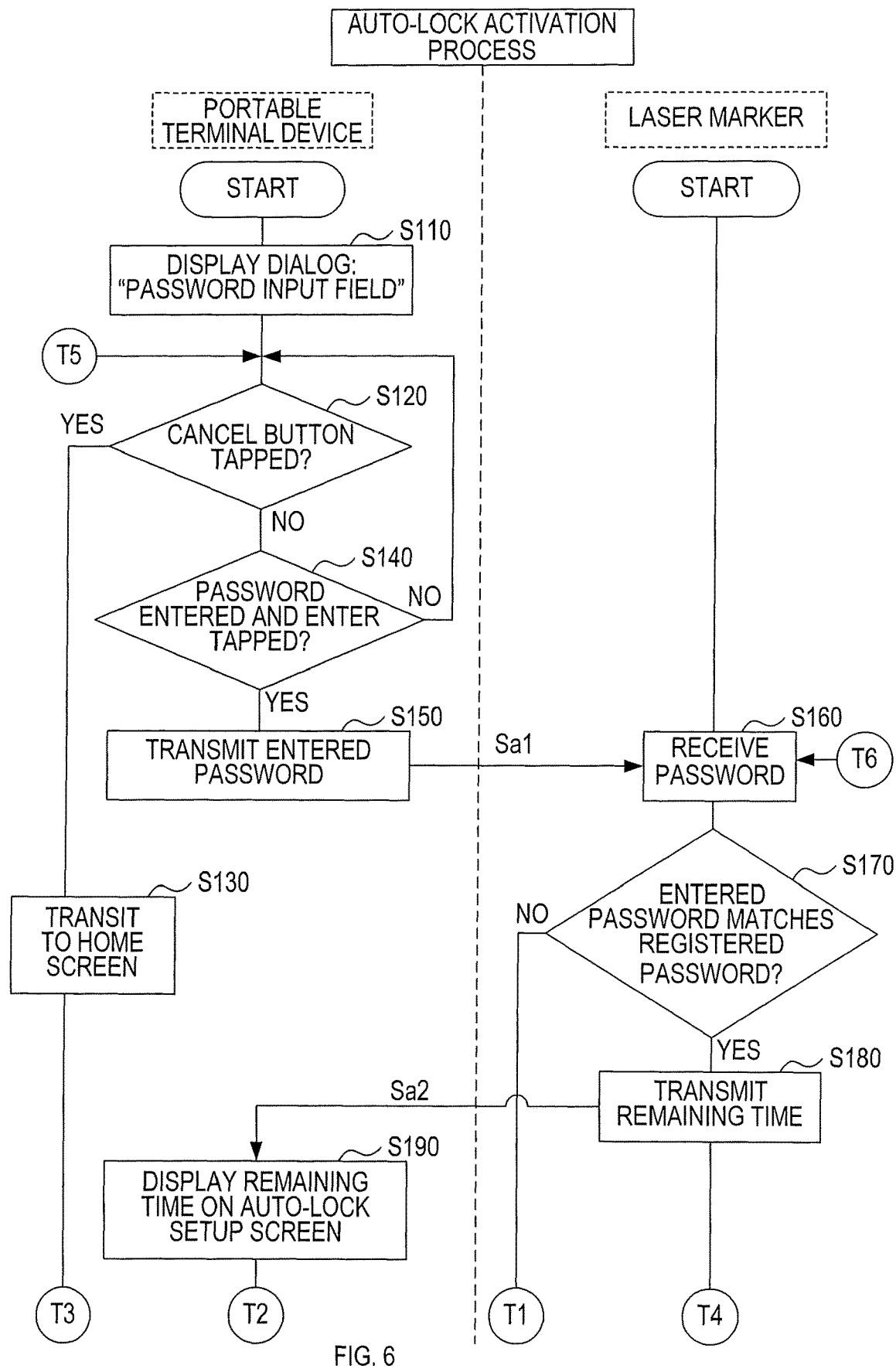
FIG. 6 is a firstسequence diagram showing processing details of an auto-lock activation process.
Figure 7:
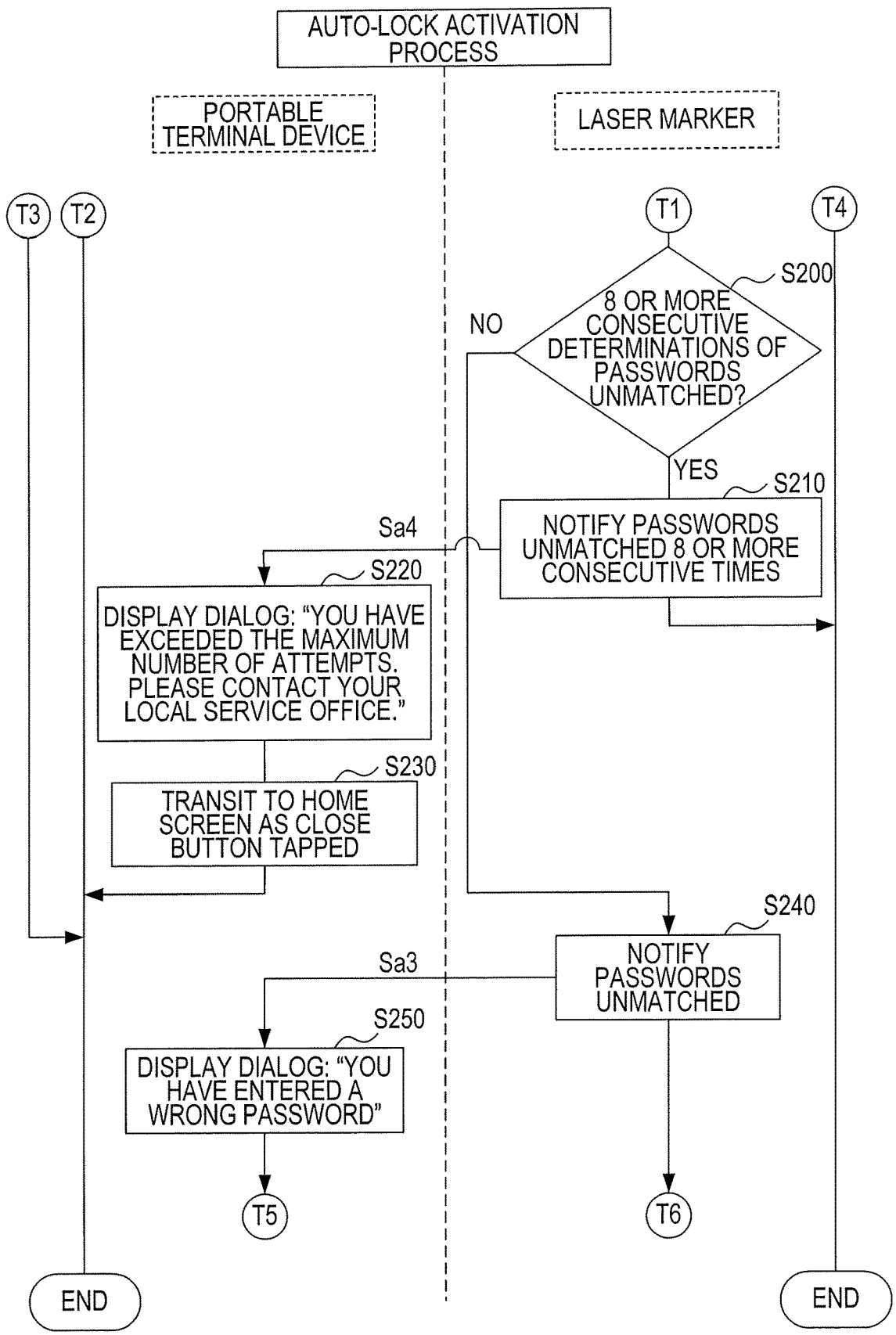
FIG. 7 is a second sequence diagram showing processing details of the auto-lock activation process.

Descriptions will be given of the auto-lock activation process with reference to the sequence diagrams of FIGS. 6 and 7. The sequence diagrams of FIGS. 6 and 7 illustrate details of processing executed by the terminal controller 53 of the portable terminal device 51 and those by the device controller 31 of the laser marker 10, respectively.

The auto-lock activation process is initiated when the user selects (or taps) the auto-lock button on the home screen displayed on the terminal display 57. The terminal display 57 together with the terminal operation portion 54 forms an LCD device with a touch panel. Thus, the terminal operation portion 54 is configured to receive an input manipulation and a selecting manipulation onto the terminal display 57 by the user.

Figure 4C:
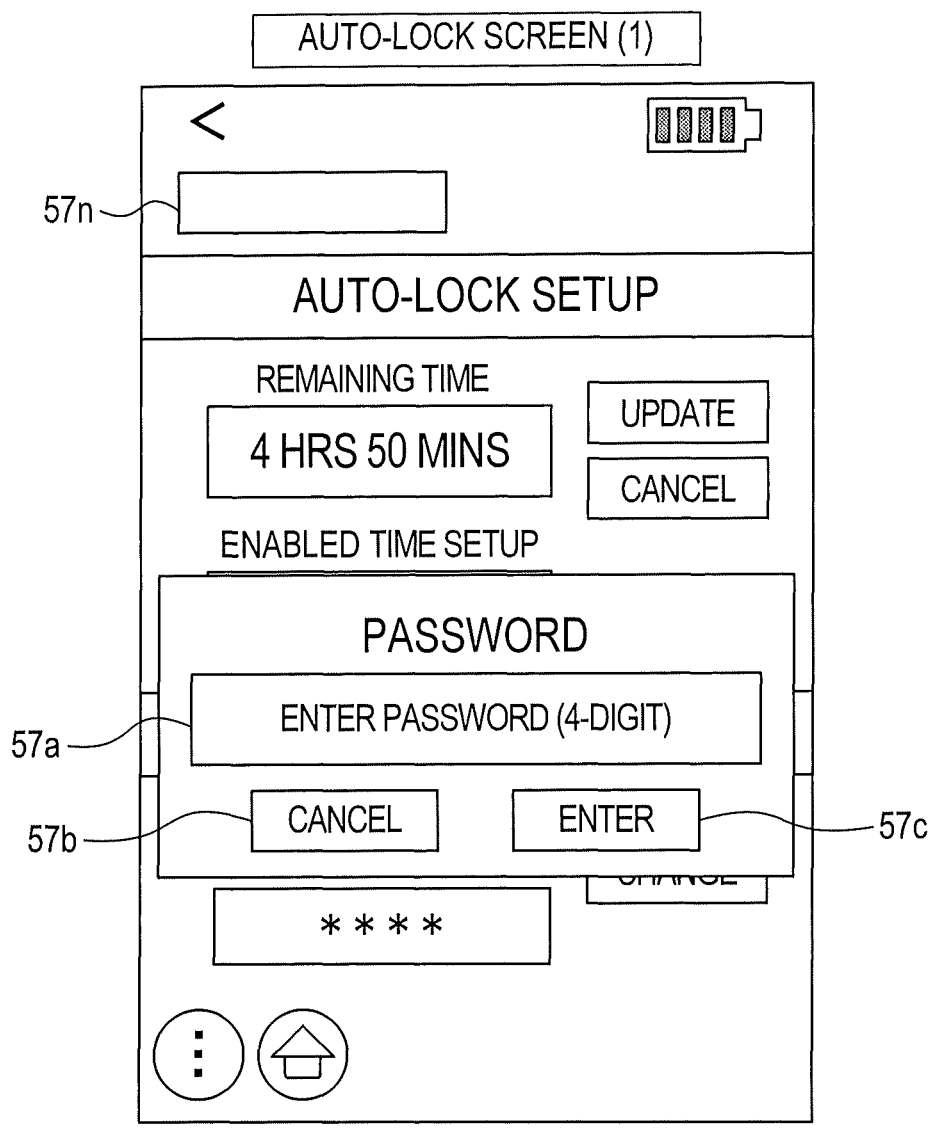
FIG. 4C is an explanatory diagram of an auto-lock screen (1)

When the auto-lock activation process is initiated, the terminal controller 53 of the portable terminal device 51, in S110 (S denotes Step here and hereafter), first displays a dialog: password input field. Specifically, the terminal controller 53 displays the auto-lock screen (1) shown in FIG. 4C, on the terminal display 57. The password input field is an input field 57a on the auto-lock screen (1) shown in FIG. 4C.

The terminal controller 53, in the subsequent S120, determines whether a "cancel" button has been selected (or tapped). If the cancel button has been selected (S120: YES), the process proceeds to S130. The cancel button is a cancel button 57b on the auto-lock screen (1) shown in FIG. 4C. If the cancel button has not been selected (S120: NO), the process proceeds to S140.

In S130, the terminal controller 53 erases the dialog from the terminal display 57 and displays the home screen on the terminal display 57. The terminal controller 53 finishes S130, and then the auto-lock activation process is terminated.

In S140, the terminal controller 53 determines whether an "ENTER" button has been tapped after the password entry. If the ENTER button has been tapped (S140: YES), the process proceeds to S150. The ENTER button is an enter button 57c on the auto-lock screen (1) shown in FIG. 4C. If the ENTER button has not been tapped (S140: NO), the process returns to S120.

In S150, the terminal controller 53 transmits the first information signal Sa1 to the laser marker 10 via a wireless communication. The first information signal Sa1 corresponds to a signal including a password (or a passcode) SN1 (hereinafter, to be also referred to as an input password SN1) entered by the user. In other words, the terminal controller 53 transmits the input password SN1 to the laser marker 10. The input password SN1 includes a string of characters, numbers, and/or symbols.

The device controller 31 of the laser marker 10, in S160, waits to receive the first information signal Sa1. Upon receipt of the first information signal Sa1 in S160, the device controller 31 determines whether the received input password SN1 matches (or is consistent with) a registered password SNR in S170. The registered password SNR is registered in the laser marker 10. If the input password SN1 matches the registered password SNR (S170: YES), the process proceeds to S180. The registered password SNR includes a string of characters, numbers, and/or symbols. If the input password SN1 is unmatched with (or is inconsistent with) the registered password SNR (S170: NO), the process proceeds to S200.

The memory 31b of the device controller 31 stores the registered password SNR. The registered password SNR is a password information assigned to the laser marker 10.

In S180, the device controller 31 transmits a second information signal Sa2 to the portable terminal device 51 via a wireless communication. The second information signal Sa2 corresponds to a signal indicating a remaining time that is possessed in the laser marker 10. The device controller 31 includes a timer function to measure (or count) a time. The remaining time is measured by the timer function of the device controller 31.

Figure 4D:
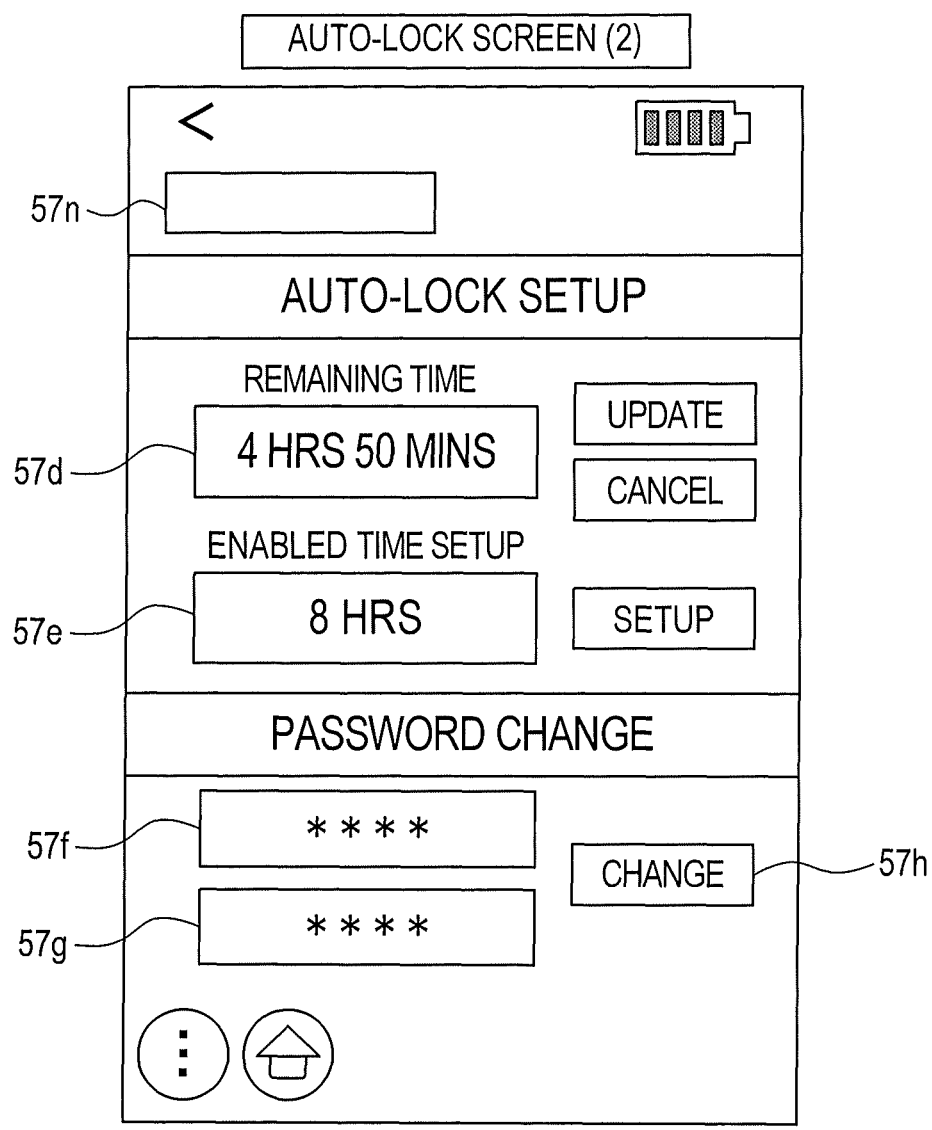
FIG. 4D is an explanatory diagram of an auto-lock screen (2)

Upon receipt of the second information signal Sa2, the terminal controller 53 displays the received remaining time on the terminal display 57, in S190. Specifically, the terminal controller 53 displays the remaining time on a remaining time field of the auto-lock screen (2) shown in FIG. 4D. The remaining time field corresponds to a time field 57d of the auto-lock screen (2) shown in FIG. 4D.

In S200, the device controller 31 determines whether eight or more consecutive determinations have been made that the input password SN1 is unmatched with the registered password SNR. If the eight or more consecutive determinations have been made (S200: YES), the process proceeds to S210. If the eight or more consecutive determinations have not been made (S200: NO), the process proceeds to S240.

In S240, the device controller 31 transmits a third information signal Sa3 to the portable terminal device 51 via a wireless communication. The third information signal Sa3 corresponds to a signal to notify that the input password SN1 is unmatched with the registered password SNR. The device controller 31 finishes S240, and then the process returns to S160. The device controller 31 then waits to receive the first information signal Sa1.

Upon receipt of the third information signal Sa3, the terminal controller 53 displays a dialog with a notification text "You have entered a wrong password" in S250. Specifically, the terminal controller 53 displays a dialog screen (1) with a notification (1) shown in FIG. 4G, on the terminal display 57. The terminal controller 53 finishes S250, and then the process returns to S120.

In S210, the device controller 31 transmits a fourth information signal Sa4 to the portable terminal device 51 via a wireless communication. The fourth information signal Sa4 corresponds to a signal to notify that the password entered by the user is unmatched with the registered password eight or more consecutive times. The device controller 31 finishes S210, and then the auto-lock activation process is terminated.

Upon receipt of the fourth information signal Sa4, the terminal controller 53 displays a dialog with a notification text "You have exceeded the maximum number of attempts. Please contact your local service office", in S220. Specifically, the terminal controller 53 displays a dialog screen (1) with a notification (2) shown in FIG. 4G, on the terminal display 57.

The terminal controller 53 finishes S220, and then the process proceeds to S230. When the user selects (or taps) a "close" button, the terminal controller 53 erases the dialog from the terminal display 57 and displays the home screen on the terminal display 57. The terminal controller 53 terminates S230, and then the auto-lock activation process is terminated.

The terminal controller 53 finishes the processing of any one of S130, S190, and S230, and then the auto-lock activation process is terminated. The device controller 31 finishes the processing of either S180 or S210, and then the auto-lock activation process is terminated.

As described above, the electric work system 1 executes the auto-lock activation process to determine whether the input password SN1 matches the registered password SNR. If the input password SN1 matches the registered password SNR, the electric work system 1 displays the remaining time, which is possessed in the laser marker 10, on the terminal display 57 of the portable terminal device 51.

The device controller 31 executes the auto-lock activation process to authenticate, based on the registered password SNR, the portable terminal device 51 that is connected therewith via a wireless communication (S170). The first device communicator 21a is configured to receive the first information signal Sa1 (i.e. the input password SN1) from the portable terminal device 51 via the wireless communication.

If the input password SN1 matches the registered password SNR (S170: YES), the device controller 31 transmits the second information signal Sa2 to the portable terminal device 51 (S180). By doing so, the device controller 31 permits the portable terminal device 51 to transmit a permission signal (a later-described seventh information signal Sa1) to the laser marker 10.

If the input password SN1 is unmatched with the registered password SNR (S170: NO), the device controller 31 transmits the third information signal Sa3 or the fourth information signal Sa4 instead of the second information signal Sat, to the portable terminal device 51. By doing so, the device controller 31 does not permit the portable terminal device 51 for transmitting the permission signal (i.e. the seventh information signal Sa7) to the laser marker 10. More specifically, the portable terminal device 51 is not allowed to display an auto-lock setup screen, and is, accordingly, not allowed to transmit the seventh information signal Sa7 to the laser marker 10.

In the portable terminal device 51, the terminal operation portion 54 receives the input password SN1 (corresponding to the second authentication code of the present disclosure) from the user, with which to verify the registered password SNR of the laser marker 10. The terminal controller 53 outputs the input password SN1 to the laser marker 10 via the terminal communicator 59.

1-3-2. Displayed Remaining Time Update Process and Timer Cancelling Process

Figure 8:
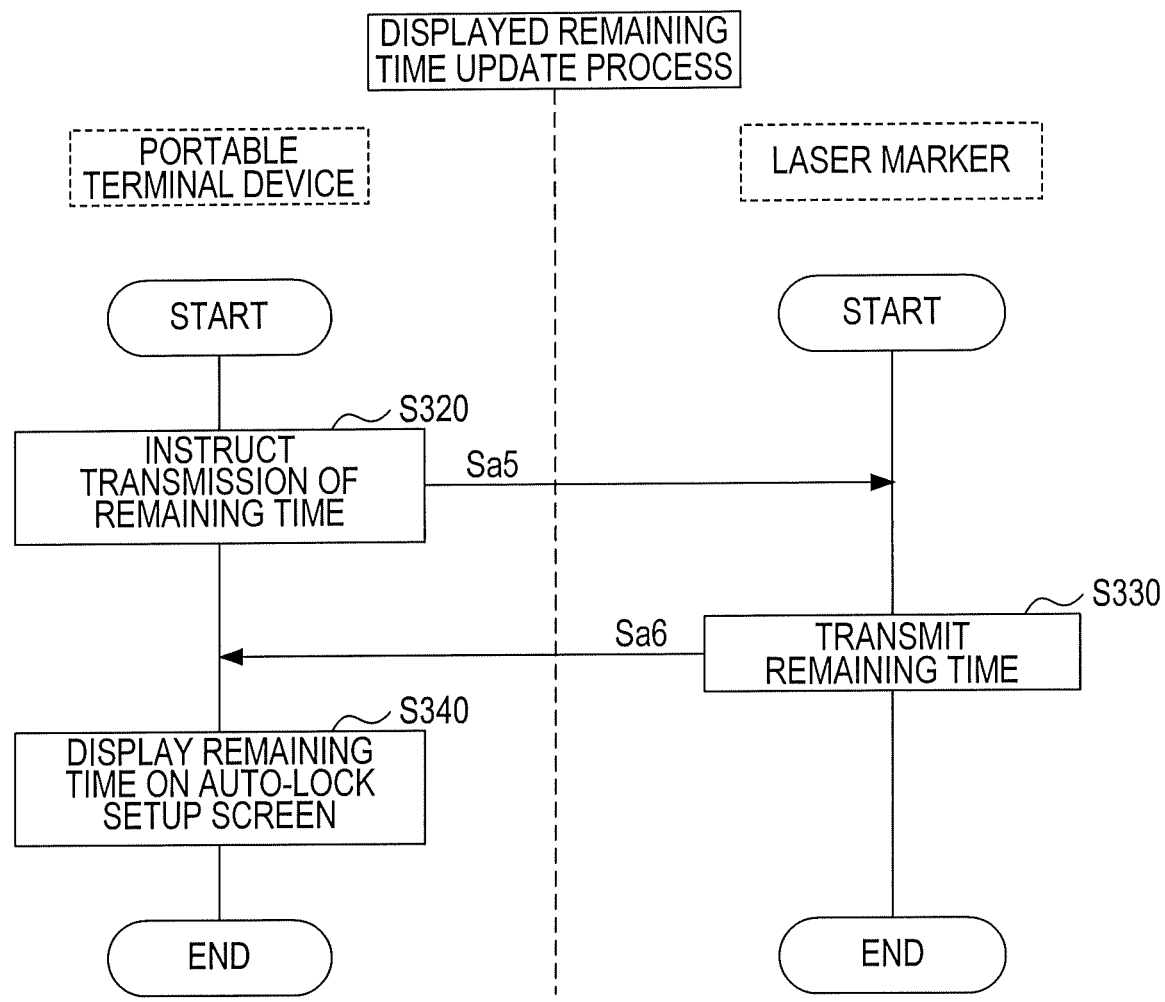
FIG. 8 is a sequence diagram showing processing details of a displayed remaining time update process.

Description will be given of the displayed remaining time update process with reference to the sequence diagram of FIG. 8. The sequence diagram illustrates details of processing executed by each of the terminal controller 53 of the portable terminal device 51 and the device controller 31 of the laser marker 10.

The displayed remaining time update process is initiated when the user selects (or taps) an "update" button on the auto-lock screen (2) (see, FIG. 4D) in the terminal display 57.

When the displayed remaining time update process is initiated, the terminal controller 53 first transmits a fifth information signal Sa5 to the laser marker 10 via a wireless communication, in S320. The fifth information signal Sa5 corresponds to a signal requesting for the remaining time. In other words, the fifth information signal Sa5 requests the portable terminal device 51 to transmit the remaining time to the laser marker 10.

Upon receipt of the fifth information signal Sa5, the device controller 31 transmits a sixth information signal Sa6 to the portable terminal device 51 via a wireless communication, in S330. The sixth information signal Sa6 corresponds to a signal indicating the remaining time that is possessed in the laser marker 10 at the time of receipt of the fifth information signal Sa5.

Upon receipt of the sixth information signal Sa6, the terminal controller 53 updates a time displayed on the remaining time field of the auto-lock screen (2) based on the received remaining time, in S340.

The terminal controller 53 finishes S340, and then the displayed remaining time update process is terminated. The device controller 31 finishes S330, and then the displayed remaining time update process is terminated.

As described above, the electric work system 1 executes the displayed remaining time update process to transmit the remaining time from the laser marker 10 to the portable terminal device 51, in response to the request from the user for updating. The electric work system 1 then updates the time displayed on the remaining time field of the auto-lock screen (2).

Figure 15:
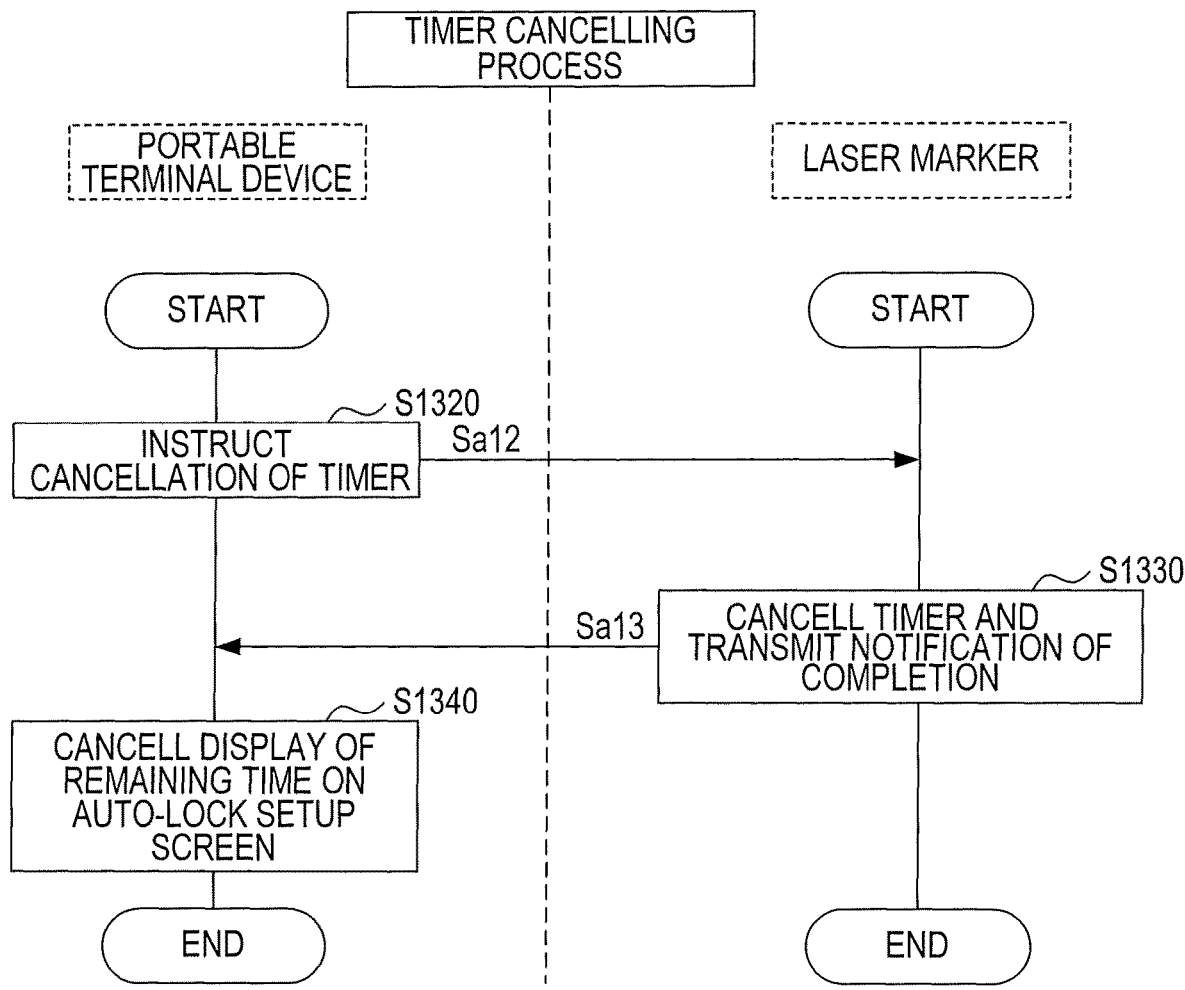
FIG. 15 is a sequence diagram showing processing details of a timer cancelling process.

Subsequently, descriptions will be given of the timer cancelling process with reference to the sequence diagram of FIG. 15. The sequence diagram illustrates details of processing executed by each of the terminal controller 53 of the portable terminal device 51 and the device controller 31 of the laser marker 10.

The timer cancelling process is initiated when the user selects (or taps) a "cancel" button on the auto-lock screen (2) (see, FIG. 4D) in the terminal display 57.

When the timer cancelling process is initiated, the terminal controller 53 first transmits a twelfth information signal Sa12 to the laser marker 10 via a wireless communication, in S1320. The twelfth information signal Sa12 corresponds to a signal from the portable terminal device 51 to the laser marker 10 to command for cancellation of a timer. The cancellation of the timer can lead to, for example, deletion of an enabled time or the remaining time.

Upon receipt of the twelfth information signal Sa12, in S1330, the device controller 31 cancels the timer in the laser marker 10 and then transmits a thirteenth information signal Sa13 to the portable terminal device 51 via a wireless communication. The device controller 31 deletes each of the enabled time, and the remaining time to cancel the timer. The thirteenth information signal Sa13 corresponds to a signal to notify that the cancellation of the timer is completed.

Upon receipt of the thirteenth information signal Sa13, the terminal controller 53 deletes the time displayed in the remaining time field of the auto-lock screen (2), in S1340. This results in the remaining time field of the lock screen (2) to be blank. Furthermore, the terminal controller 53 deletes the time displayed in the enabled time setup field of the auto-lock screen (2), in S1340. This results in the enabled time setup field of the lock screen (2) to be blank.

The terminal controller 53 finishes S1340, and then the timer cancelling process is terminated. The device controller 31 finishes S1330, and then the timer cancelling process is terminated.

As described above, the electric work system 1 executes the timer cancelling process to delete the enabled time and the remaining time in the laser marker 10, in response to the request from the user for updating. The electric work system 1 then deletes the time displayed on the remaining time field of the auto-lock screen (2).

1-3-3. Enabled Time Setup Process

Figure 9:
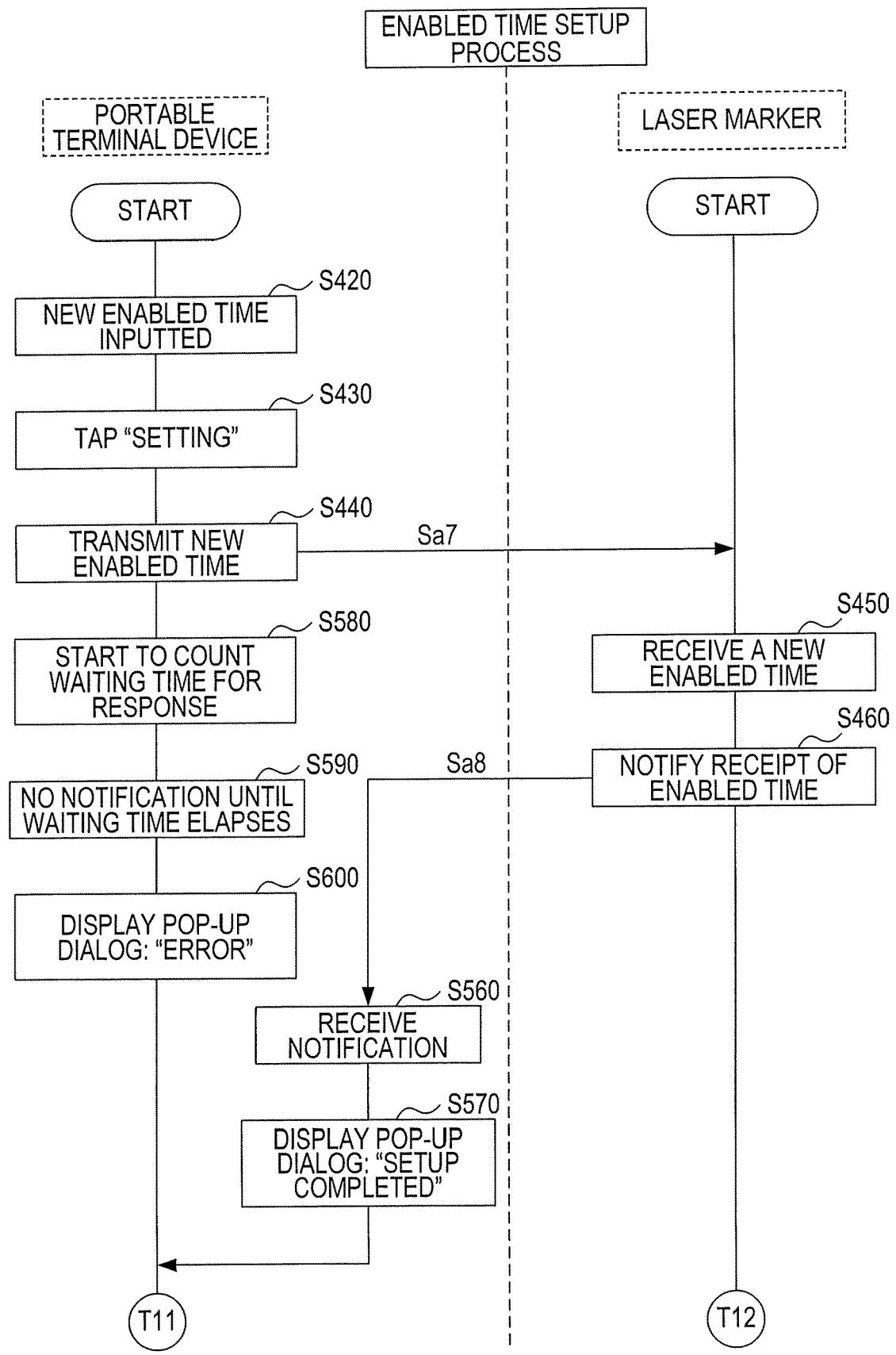
FIG. 9 is a first sequence diagram showing processing details of an enabled time setup process.
Figure 10:
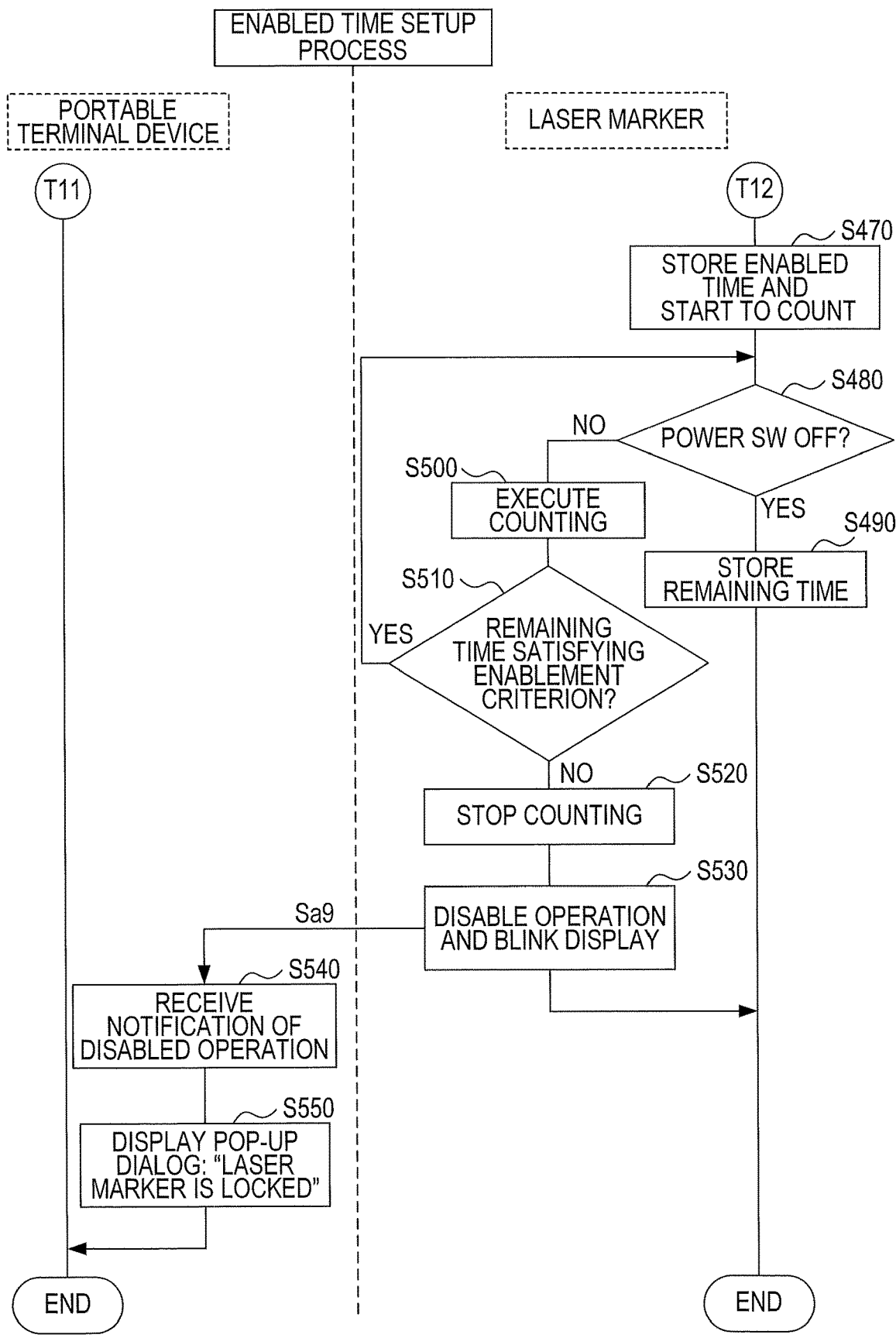
FIG. 10 is a second sequence diagram showing processing details of the enabled time setup process.

Descriptions will be given of the enabled time setup process with reference to the sequence diagrams of FIGS. 9 and 10. Those sequence diagrams illustrate details of processing executed by each of the terminal controller 53 of the portable terminal device 51 and the device controller 31 of the laser marker 10.

The enabled time setup process is initiated when the user selects (or taps) the enabled time setup field of the auto-lock screen (2) (see, FIG. 4D) in the terminal display 57. The enabled time setup field is a setting field 57e in the auto-lock screen (2) shown in FIG. 4D.

When the enabled time setup process is initiated, the terminal controller 53 first waits until the user enters a new enabled time into the enabled time setup field, in S420. When the new enabled time is entered, the process proceeds to S430. The enabled time is a time-period during which the laser marker 10 is enabled to operate.

The terminal controller 53, in S430, waits until the user selects (or taps) a "setting" button. When the setting button is tapped, the process proceeds to S440.

The terminal controller 53, in S440, transmits the seventh information signal Sa7 to the laser marker 10 via a wireless communication. The seventh information signal Sa7 corresponds to a signal including the new enabled time. The terminal controller 53 transmits the seventh information signal Sa7 to the laser marker 10 via the terminal communicator 59. In accordance with that, in the laser marker 10, the first device communicator 21a receives the seventh information signal Sa7.

In response to receipt of the seventh information signal Sa7 by the first device communicator 21a, the device controller 31 receives the new enabled time, in S450. In other words, the device controller 31 extracts information of the new enabled time from the seventh information signal Sa1.

The device controller 31, in the subsequent S460, transmits an eighth information signal Sa8 to the portable terminal device 51 via a wireless communication. The eighth information signal Sa8 corresponds to a signal to notify that the new enabled time has been received. The device controller 31 finishes S460, and then the process proceeds to S470.

Upon receipt of the eighth information signal Sa8, the portable terminal device 51 receives a notification from the laser marker 10 in S560. In other words, the terminal controller 53 receives a notification signal indicating that the laser marker 10 has received the new enabled time.

Figure 4E:
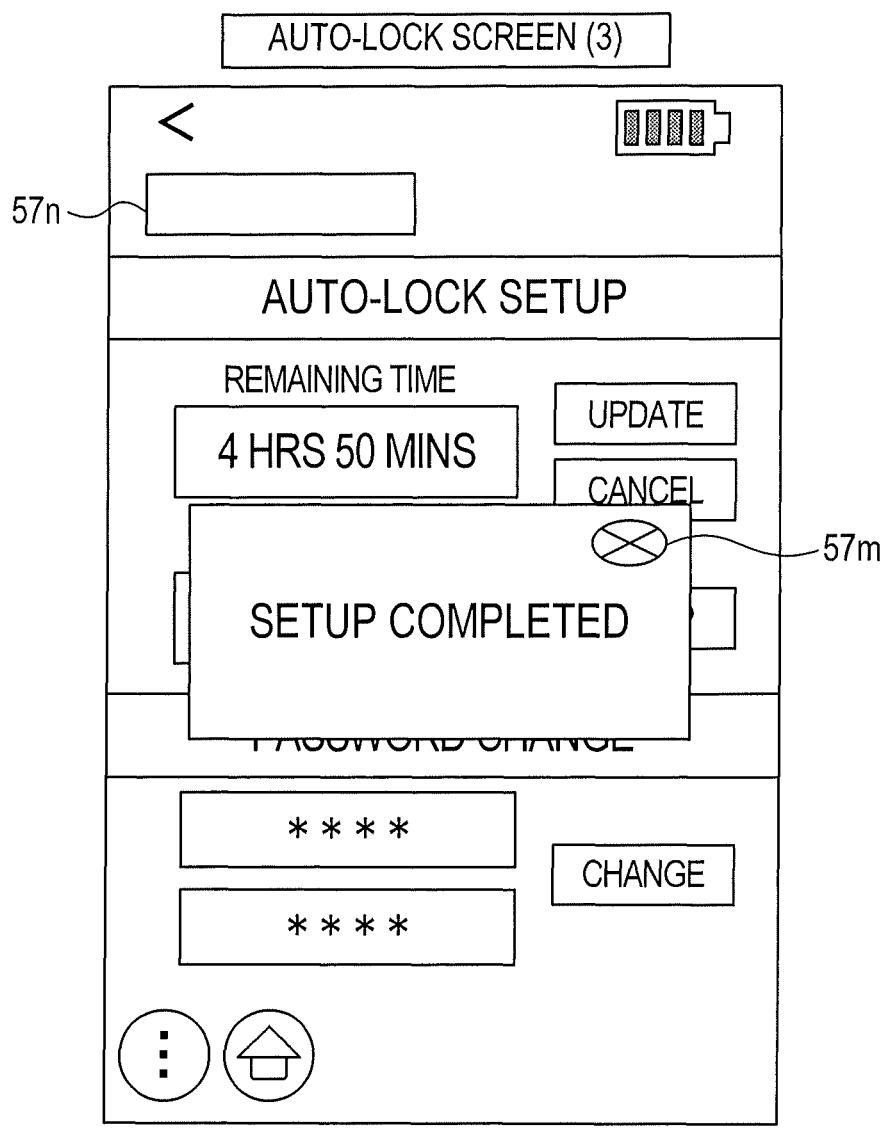
FIG. 4E is an explanatory diagram of an auto-lock screen (3)

The terminal controller 53, in the subsequent S570, displays a pop-up dialog box with a text: "Setup Completed". Specifically, the terminal controller 53 displays the auto-lock screen (3), which is shown in FIG. 4E, on the terminal display 57. The terminal controller 53 finishes S570, and then the enabled time setup process is terminated. The pop-up dialog box is erased by the user selecting (or tapping) a delete button 57m.

The process proceeds to S580 after S440, where the terminal controller 53 starts to count a waiting time for response. The terminal controller 53, in S590, determines whether a notification signal has been received from the laser marker 10 by a time when a predefined waiting time elapses. The terminal controller 53 discontinues the processing in S590 if the notification signal has been received by the time when the predefined waiting time elapses, and executes the processing in S560 first. The process proceeds to S600, if the terminal controller 53 has not received the notification signal by the time when the predefined waiting time elapses.

The terminal controller 53, in S600, displays a pop-up dialog box with a text: "Error". Specifically, the terminal controller 53 displays a screen displaying the text "Error" instead of the text "Setup Completed", on the terminal display 57 in the auto-lock screen (3) shown in FIG. 4E. The terminal controller 53 finishes S600, and the enabled time setup process is terminated.

The process proceeds to S470 after S460, where the device controller 31 stores the new enabled time in a memory 31b. The device controller 31 starts to count the remaining time in S470. The remaining time is obtained by subtracting an elapsed time from the new enabled time. The elapsed time is an accumulated time while a not-shown power switch of the laser marker 10 is an ON state, starting from a time of receiving the new enabled time.

The device controller 31, in the subsequent S480, determines whether the power switch of the laser marker 10 has been turned off. If the power switch of the laser marker 10 has been turned off (S480: YES), the process proceeds to S490. If the power switch of the laser marker 10 has not been turned off (S480: NO), the process proceeds to S500.

The device controller 31, in S490, stores the remaining time in the memory 31b. At this time, the remaining time is stored in a non-volatile memory region in the memory 31b. This enables the device controller 31 to read out the remaining time even after the device controller 31 is restarted after a stoppage.

The device controller 31, in S500, executes a counting processing of the remaining time. Specifically, the device controller 31 updates the remaining time obtained by subtracting a specified time-period from the remaining time. The specified time-period corresponds to a difference between a time when a previous counting processing is executed and a time when a present counting processing is executed. That is, the specified time-period is subtracted from the remaining time every time the device controller 31 executes the counting processing (S500), whereby the remaining time is updated.

The device controller 31, in S510, determines whether the remaining time satisfies an enabling criterion. If the enabling criterion is satisfied (S510: YES), the process returns to S480. If the enabling criterion is not satisfied (S510: NO), the process proceeds to S520. The enabling criterion is as follows: the remaining time is greater than 0 sec. Thus, for example, if the remaining time is greater than 0 sec. (in other words, the elapsed time is smaller than the enabled time), the device controller 31 determines that the enabling criterion is satisfied in S510. Likewise, if the remaining time is smaller than 0 sec. (in other words, the elapsed time is equal to or greater than the enabled time), the device controller 31 determines that the enabling criterion is not satisfied in S510.

The device controller 31, in S520, stops the counting processing of the remaining time.

The device controller 31, in S530, stops a laser beam emitting operation and a rotational motion of the laser marker 10. Specifically, the device controller 31 disables an operation of the laser driving circuit 33 and an operation of the light emitter 34, to thereby stop the laser beam emitting operation of the laser marker 10. For example, the device controller 31 may stop outputting a command signal to the laser driving circuit 33 and the laser emitter 34, to thereby disable the operation of the laser driving circuit 33 and the operation of the light emitter 34. The device controller 31 disables an operation of the motor driving circuit 35 and an operation of the motor 36, to thereby stop the rotational motion of the rotary body 12 in the laser marker 10. For example, the device controller 31 may stop outputting a command signal to the motor driving circuit 35 and the motor 36, to thereby disable the operation of the motor driving circuit 35 and the operation of the motor 36.

The device controller 31, in S530, causes all the indicators of the device display 37 (the luminance indicator 37*a*, the wireless communication indicator 37*b*, and the battery state indicator 37*c*) to blink. In this way, the user can be notified of a state where the operation of the laser marker 10 is disabled.

The device controller 31, in S530, transmits a ninth information signal Sa9 to the portable terminal device 51 via a wireless communication. The ninth information signal Sa9 corresponds to a signal to notify that the remaining time is 0. In other words, the ninth information signal Sa9 corresponds to a signal to notify that the laser marker 10 is in an operation-disabled state.

The terminal controller 53 receives the ninth information signal Sa9 in S540. In other words, the terminal controller 53 receives a notification signal indicating that the laser marker 10 is in the operation-disabled state.

The terminal controller 53, in the subsequent S550, displays a pop-up dialog box with a text: "Laser Marker is Locked". Specifically, the terminal controller 53 displays a screen displaying the text "Laser Marker is Locked" instead of the text "Setup Completed", on the terminal display 57 in the auto-lock screen (3) shown in FIG. 4E. The terminal controller 53 finishes S550, and then the enabled time setup process is terminated.

When finishing the processing of any one of S550, S570, and S600, the terminal controller 53 terminates the enabled time setup process. When finishing the processing of either S490 or S530, the device controller 31 terminates the enabled time setup process.

As described above, the electric work system 1 executes the enabled time setup process, to thereby set the new enabled time into the laser marker 10 via a wireless communication. Once the enabled time is set, the laser marker 10 starts the processing of counting the elapsed time. Once the enabled time has elapsed, the laser marker 10 disables (or stops) the operation of the laser marker 10. Once the operation of the laser marker 10 is stopped, the portable terminal device 51 displays the pop-up dialog box with the text as such.

The device controller 31 executes the enabled time setup process, to thereby start to measure the elapsed time (S470) in response to receipt (S450) of the seventh information signal Sa7 (the permission signal). The device controller 31 measures the remaining time, namely, the difference between the elapsed time and the enabled time (S470, S500). The device controller 31 determines whether the remaining time satisfies the enabling criterion (i.e. the remaining time is greater than 0 sec.) (S510). If the remaining time is smaller than 0 sec. (S510: NO), the device controller 31 stops the laser beam emitting operation and the rotational motion of the laser marker 10 (S530). If the remaining time does not satisfy the enabling criterion (i.e. the remaining time is smaller than 0 sec.) (S510: NO), the device controller 31 disables the laser beam emitting operation and the rotational motion of the laser marker 10.

The terminal communicator 59 in the portable terminal device 51 wirelessly communicates with the laser marker 10 to transmit and receive various information. The terminal operation portion 54 receives the new enabled time from the user. The terminal controller 53 executes the enabled time setup process, to thereby transmit the seventh information signal Sa7 to the laser marker 10 via the terminal communicator 59 (S440).

1-3-4. Password Change Process

Figure 11:
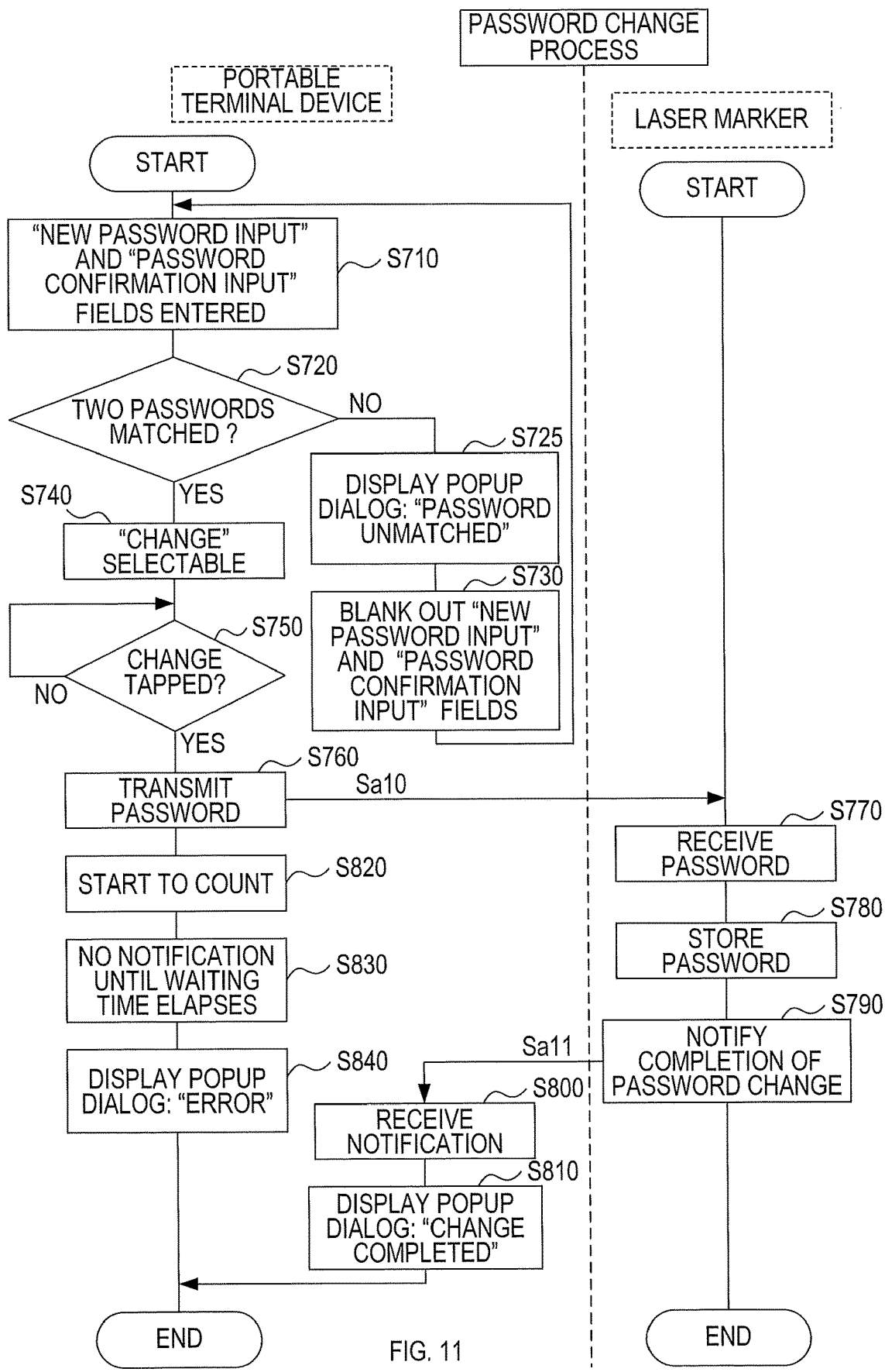
FIG. 11 is a sequence diagram showing processing details of a password change process.

Descriptions will be given of the password change process with reference to the sequence diagram of FIG. 11. The sequence diagram illustrates details of processing executed by the terminal controller 53 of the portable terminal device 51, and the device controller 31 of the laser marker 10.

The password change process is initiated when the user selects (or taps) a new password input field on the auto-lock screen (2) (see, FIG. 4D) in the terminal display 57. The new password input field is a new number field 57*f* on the auto-lock screen (2) shown in FIG. 4D.

When the password change process is initiated, the terminal controller 53 first waits for a new password to be inputted, by the user, into each of the new password input field and a password confirmation input field in S710. When the new password is inputted, the process proceeds to S720. The password confirmation input field is a new number field 57*g* on the auto-lock screen (2) shown in FIG. 4D.

The terminal controller 53, in S720, determines whether the new password inputted in the password confirmation input field match the new password inputted in the new password input field. If the two passwords match (S720: YES), the process proceeds to S740. If the two passwords are unmatched with each other (S720: NO), the process proceeds to S725.

Figure 4F:
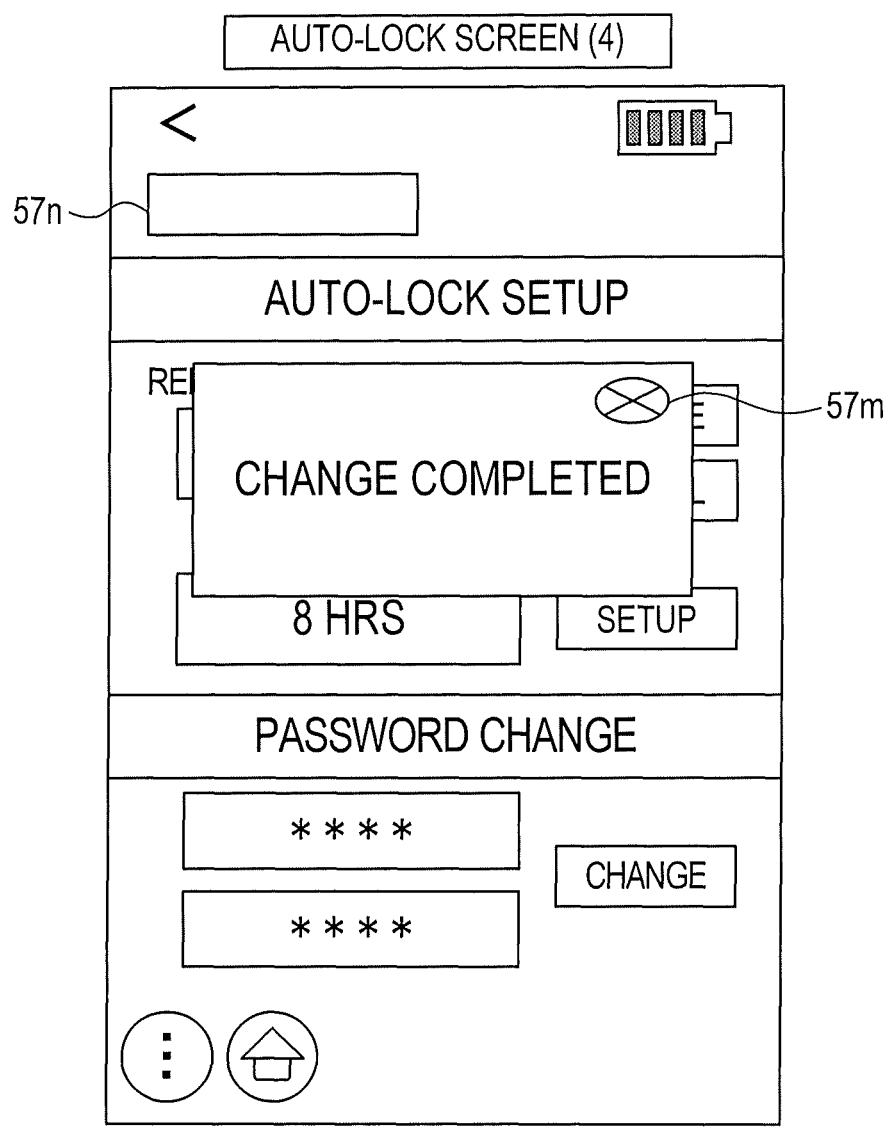
FIG. 4F is an explanatory diagram of an auto-lock screen (4)
Figure 4G:
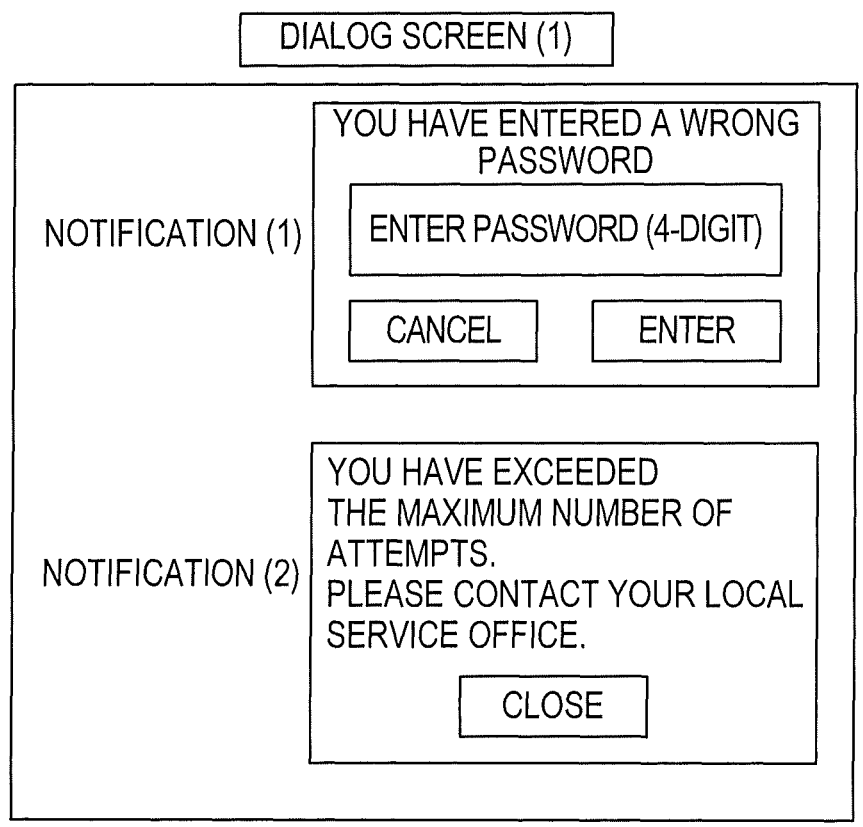
FIG. 4G is an explanatory diagram of a dialog screen (1)

The terminal controller 53, in S725, displays a pop-up dialog box with a text: "Password Unmatched". Specifically, the terminal controller 53 displays a screen displaying the text "Password Unmatched" instead of the text "Change Completed", on the terminal display 57 in the auto-lock screen (4) shown in FIG. 4F. When the terminal controller 53 finishes S725, the process proceeds to S730.

The terminal controller 53, in S730, blanks out each of the new password input field and the password confirmation input field. When the terminal controller 53 finishes S730, the process proceeds to S710.

The terminal controller 53, in S740, sets a "change" button to selectable (or tappable). The change button is a change button 57*h* on the auto-lock screen (2) shown in FIG. 4D.

The terminal controller 53, in S750, determines whether the change button has been selected (or tapped). If the change button has been selected (S750: YES), the process proceeds to S760. If the change button has not been selected (S750: NO), the terminal controller waits while repeatedly executing this step of S750.

The terminal controller 53, in S760, transmits a tenth information signal Sa10 to the laser marker 10 via a wireless communication. The tenth information signal Sa10 corresponds to a signal to transmit the new password.

The device controller 31, in S770, receives the tenth information signal Sa10. The device controller 31, in the subsequent S780, stores the new password in the memory 31*b*.

The device controller 31, in the subsequent S790, transmits an eleventh information signal Sa11 to the portable terminal device 51 via a wireless communication. The eleventh information signal Sa11 corresponds to a signal to notify that the password change has been completed. The device controller 31 finishes S790, and then the password change process is terminated.

Upon receipt of the eleventh information signal Sa11, the portable terminal device 51 receives a notification signal from the laser marker 10 in S800. In other words, the terminal controller 53 receives a notification signal indicating that the password change in the laser marker 10 has been completed.

The terminal controller 53, in the subsequent S810, displays a pop-up dialog box with a text: "Change Completed". Specifically, the terminal controller 53 displays the auto-lock screen (4) shown in FIG. 4F, on the terminal display 57. The terminal controller 53 finishes S810, and then the password change process is terminated.

The process proceeds to S820 after S760, where the terminal controller 53 starts to count the waiting time for response. The terminal controller 53, in S830, determines whether the notification signal has been received from the laser marker 10 by a time when a predefined waiting time elapses. If the notification signal has been received by the time when the predefined waiting time elapses, the terminal controller 53 discontinues the processing in S830 and executes the processing in S800 first. If the notification signal has not been received by the time when the predefined waiting time elapses, the terminal controller 53 proceeds the process to S840.

The terminal controller 53, in S840, displays a pop-up dialog box with a text: "Error". Specifically, the terminal controller 53 displays a screen displaying the text "Error" instead of the text "Change Completed", on the terminal display 57 in the auto-lock screen (4) shown in FIG. 4F. The terminal controller 53 finishes S840, and then the password change process is terminated.

As described above, the electric work system 1 executes the password change process, to thereby transmit the new password, which has been inputted into the portable terminal device 51, to the laser marker 10. The laser marker 10 changes the password to be stored in the memory 31b to the new password.

1-3-5. Service Office Display Process

Figure 12:
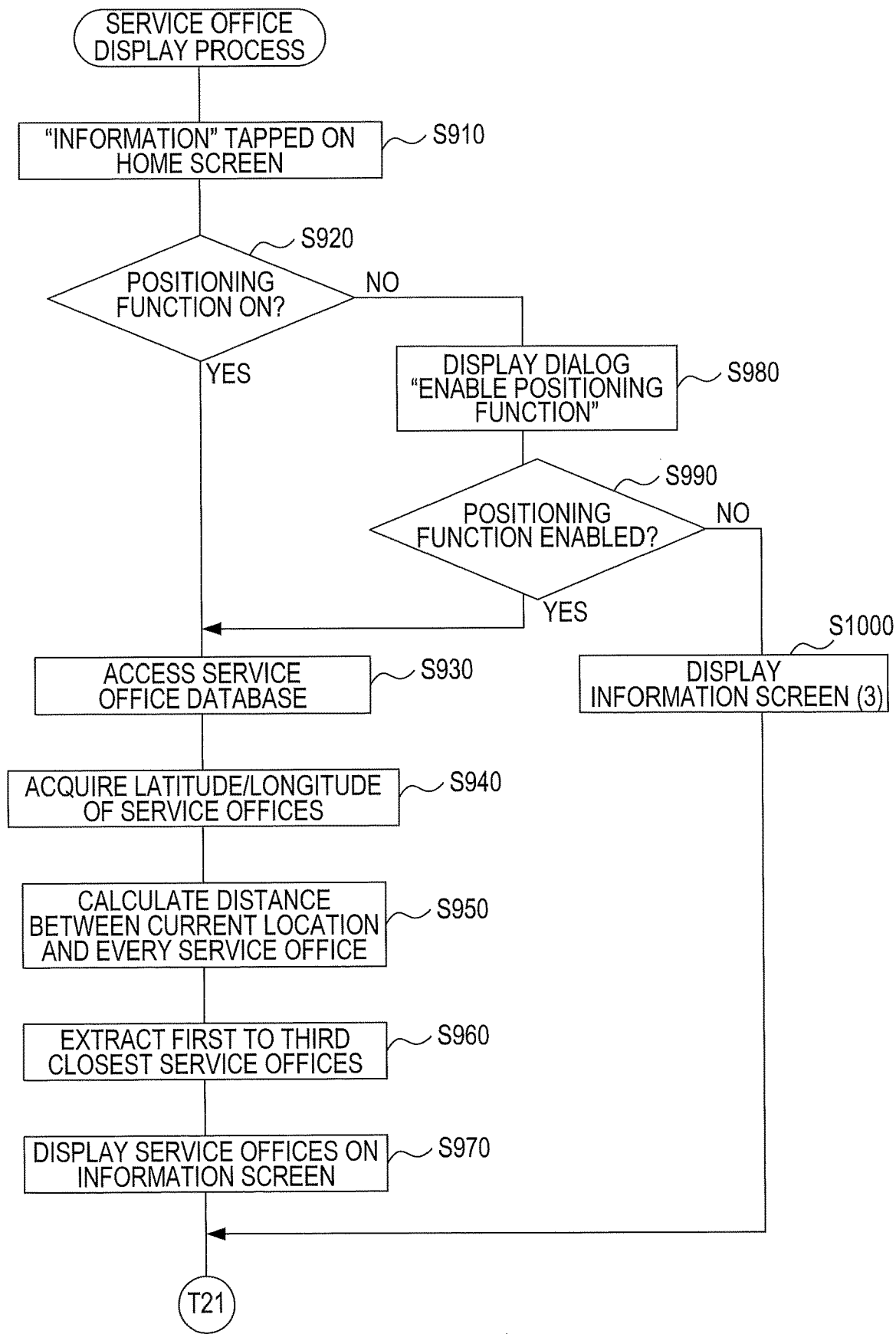
FIG. 12 is a first flow chart showing processing details of a service office display process.
Figure 13:
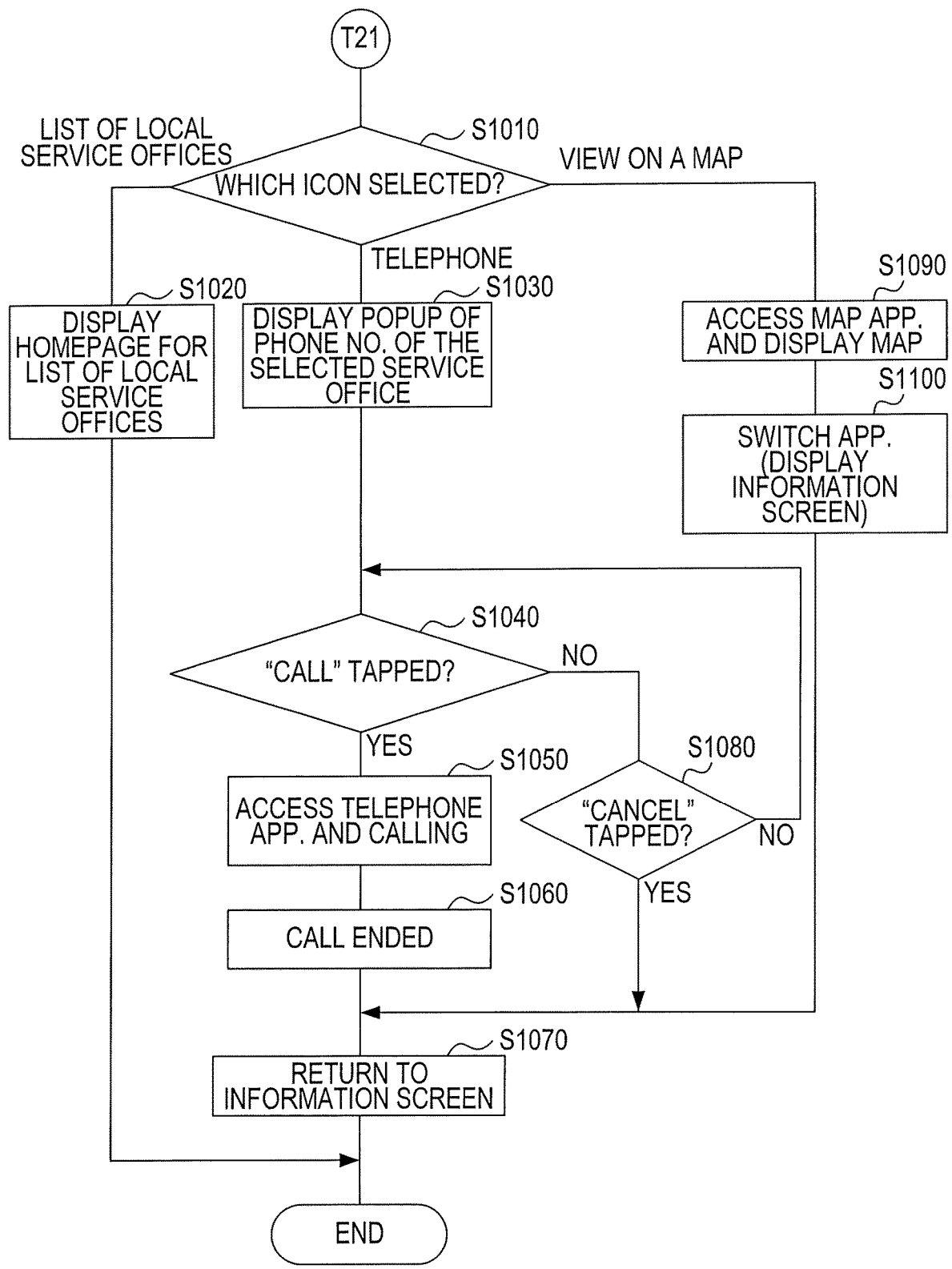
FIG. 13 is a second flow chart showing processing details of the service office display process.

Descriptions will be given of the service office display process with reference to the flow charts of FIGS. 12 and 13. The flow charts illustrates details of processing executed by the terminal controller 53 of the portable terminal device 51.

The service office display process is initiated when the user selects (or taps) the information button on the home screen (see, FIG. 4B) displayed in the terminal display 57 (S910).

When the service office display process is initiated, the terminal controller 53 of the portable terminal device 51, in S920, first determines whether a positioning (or navigation) function of the portable terminal device 51 is in an on state. The positioning function enables the terminal controller 53 to calculate (or obtain or estimate, or identify) the current position of the portable terminal device 51 on the earth based on the signals received from the satellites via the satellite signal receiver 55. If the positioning function is in the on state (S920: YES), the process proceeds to S930. If the positioning function is not in the on state (S920: NO), the process proceeds to S980.

In S930, the terminal controller 53 accesses a database including information of service offices (or service providers) (hereinafter referred to as service office information database). Specifically, the terminal controller 53 accesses a specific URL on the internet, to thereby access the service office information database. The service office information database is, for example, a CSV file in which information such as addresses and telephone numbers of service offices (or service providers) is stored. The portable terminal device 51 may be in the form of, for example, a so-called smart phone.

The terminal controller 53, in the subsequent S940, acquires latitude and longitude of each service office based on an address of the service office extracted from the service office information database. The terminal controller 53 may acquire the latitude and longitude of the service office, for example, via an application programming interface (API).

The terminal controller 53, in the subsequent S950, calculates a distance, with respect to every one of the service offices, between a current location of the user and the service office. The terminal controller 53, in the subsequent S960, extracts three service offices as local service offices, the three service offices respectively having the first, the second, and the third shortest (or closest) distance from the current location.

Figure 5B:
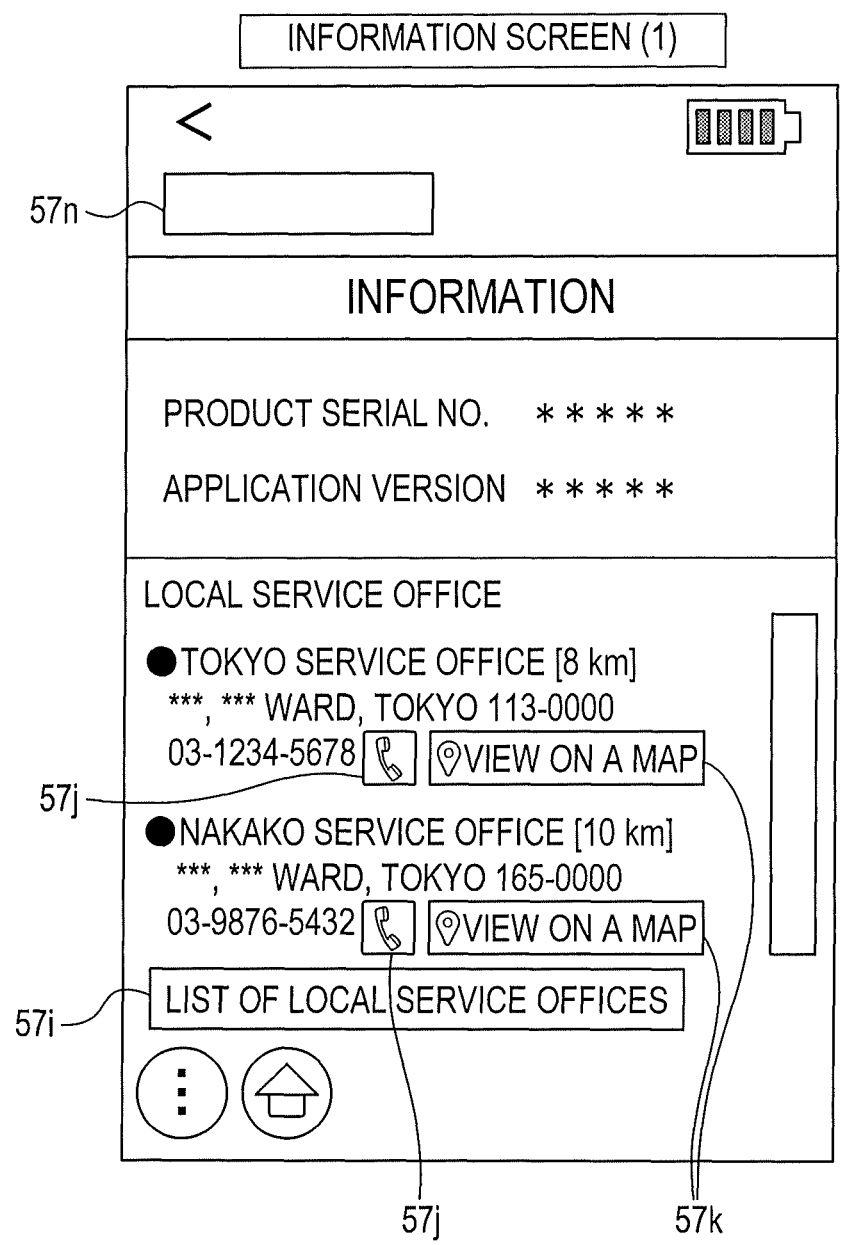
FIG. 5B is an explanatory diagram of an information screen (1)

The terminal controller 53, in the subsequent S970, displays information of the three service offices with the first to third shortest distances on the terminal display 57. Specifically, the terminal controller 53 displays the information screen (1) shown in FIG. 5B on the terminal display 57. Addresses, telephone numbers and names of the three service offices are displayed on the information screen (1). "List of Service Offices" icon, "Telephone" icon, and "View on a Map" icon are displayed on the information screen (1). "List of Service Offices" icon, "Telephone" icon, and "View on a Map" icon are displayed in a user-selectable (or tappable) fashion. "List of Service Offices" icon is a list of service offices icon 57i, "Telephone" icon is a telephone icon 57j, and "View on a Map" icon is a see on a map icon 57k, in FIG. 5B.

The terminal controller 53, in the subsequent S1010, determines which icon the user has selected. If the user selects "List of Service Offices" icon, the process proceeds to S1020. If the user selects "Telephone" icon, the process proceeds to S1030. If the user selects "View on a Map" icon, the process proceeds to S1090.

In S1020, the terminal controller 53 displays a homepage for list of service offices instead of the information screen (1). The homepage for list of service offices is a homepage screen on which branch offices and the service office are listed, and is displayed on a web browser application. The homepage for list of service offices may be, for example, a web page of list of branch offices and service offices contained in a homepage of a manufacturer of the laser marker 10. The terminal controller 53 finishes S1020, and then the service office display process is terminated.

Figure 5C:
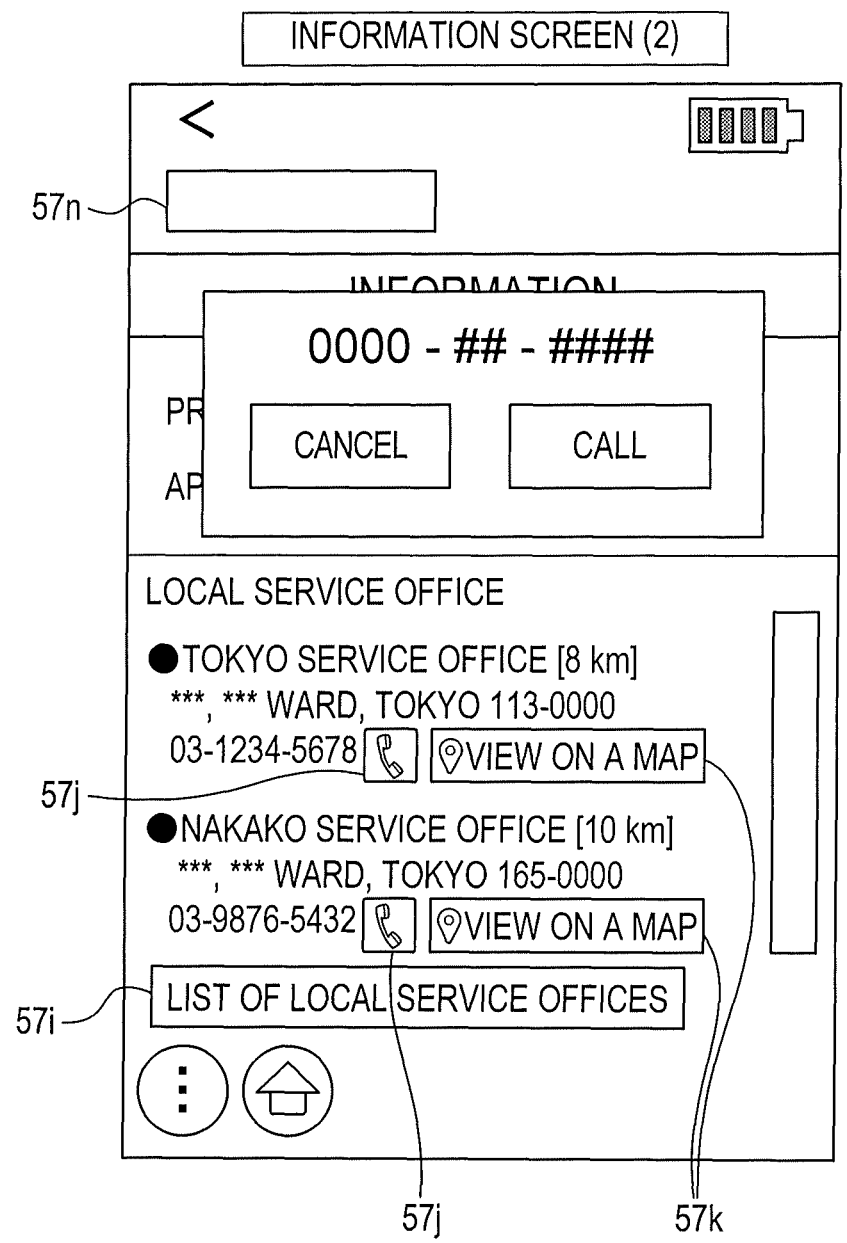
FIG. 5C is an explanatory diagram of an information screen (2)

In S1030, the terminal controller 53 displays a pop-up dialog box with a telephone number of a service office that is selected by the user. Specifically, the terminal controller 53 displays the information screen (2) shown in FIG. 5C on the terminal display 57. A "call" button and a "cancel" button are displayed in the pop-up dialog box.

The terminal controller 53, in the subsequent S1040, determines whether the call button has been selected by the user. If the call button has been selected (S1040: YES), the process proceeds to S1050. If the call button has not been selected (S1040: NO), the process proceeds to S1080.

In S1050, the terminal controller 53 accesses a telephone application and then makes a call to a telephone number of the selected service office. The terminal controller 53, in S1060, determines whether the call has been ended. If the call been ended, the terminal controller 53 finishes S1060, and then the process proceeds to S1070.

In S1070, the terminal controller 53 erases the pop-up dialog box, and then displays the information screen (1). The terminal controller 53 finishes S1070, and then the service office display process is terminated.

In S1080, the terminal controller 53 determines whether the cancel button has been selected by the user. If the cancel button has been selected (S1080: YES), the process proceeds to S1070. If the cancel button has not been selected (S1080: NO), the process proceeds to S1040.

In S1090, the terminal controller 53 accesses a map application, and then displays a map of the selected service office. The map application may be, for example, Google Map application. Google is a registered trademark of Google Inc. If the terminal controller 53 does not have any map applications installed, a web browser application may be used to display a map data of the selected service office.

The terminal controller 53, in the subsequent S1100, waits for the user to carry out an application switching operation to select an application related to the laser marker 10. When the application switching operation is carried out, the information screen (1) or the information screen (3) is displayed. The terminal controller 53 finishes S1100, and then the process proceeds to S1070.

In S980, the terminal controller 53 displays a dialog with a text: "Enable Positioning Function". Specifically, the terminal controller 53 displays a dialog screen including "Enable Positioning Function" button and "Cancel" button on the information screen (2) shown in FIG. 5C, instead of the pop-up dialog box shown therein. "Enable Positioning Function" button and "Cancel" button are displayed in a user-selectable (or tappable) fashion.

The process proceeds to S990, where the terminal controller 53 determines whether the positioning function has been enabled. If the positioning function has been enabled (S990: YES), the process proceeds to S930. If the positioning function has not been enabled (S990: NO), the terminal controller 53 proceeds the process to S1000.

Figure 14:
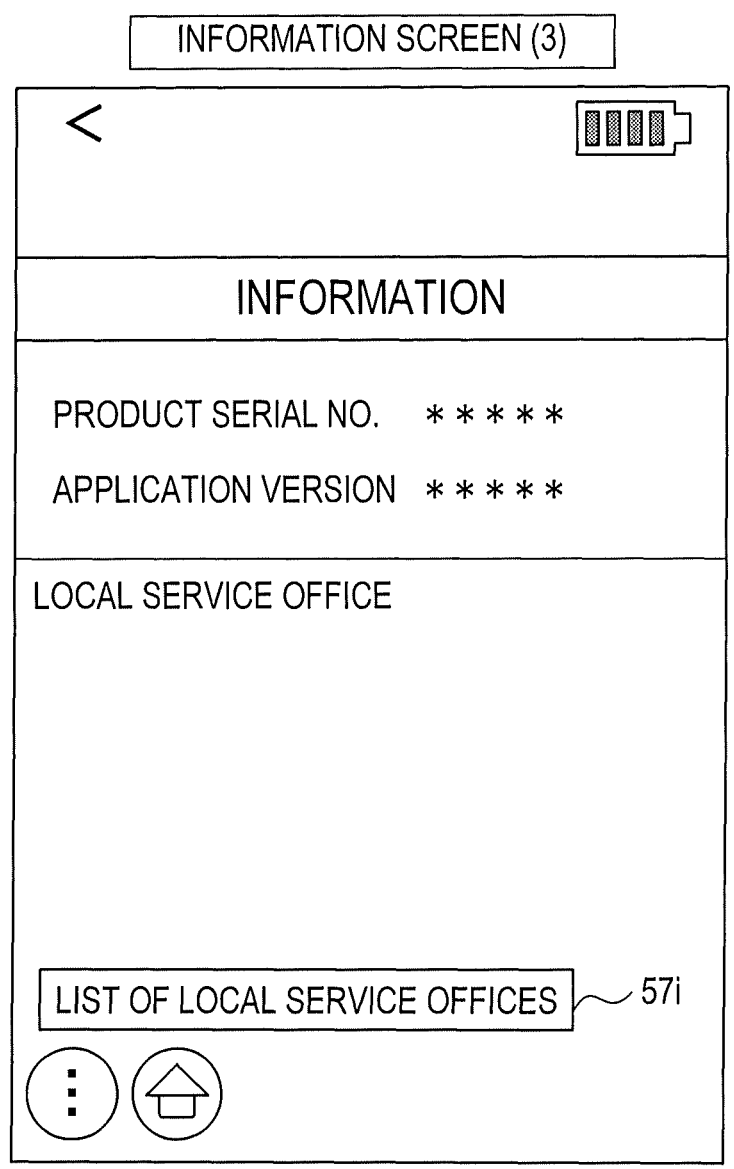
FIG. 14 is an explanatory diagram showing details of the information screens (3)(4)(5)

In S1000, the terminal controller 53 displays the information screen (3) shown in FIG. 14 on the terminal display 57. The information screen (3) is similar to the information screen (1) (see, FIG. 5B), but the local service offices field of the information screen (3) is left as a blank space since the current location determination through the positioning function cannot be made. Alternatively, a text "Not Available" may be displayed in the local service offices field of the information screen (3). The information screen (3) displays "List of Service Offices" button. The terminal controller 53 finishes S1000, and then the process proceeds to S1010. The details of processing in S1010 and the following steps have been described above, and thus the descriptions will be omitted.

The terminal controller 53 finishes S1070 or S1020, and then the service office display process is terminated.

A contact information request command is for displaying a contact information of a service provider of the laser marker 10.

The terminal controller 53 displays, on the terminal display 57, the contact information of a service office of the service provider of the laser marker 10, in response to the information button being selected (S970, S1000). The terminal display 57 at this time displays the information screen (1), the information screen (3), or the like.

1-3-6. Program Download

The terminal communicator 59 includes a not-shown data communication circuit. The terminal communicator 59 is configured to be connected with a not-shown data storage device via the data communication circuit. The data storage device is provided remotely from the portable terminal device 51. The data storage device may be a server. The data communication circuit is configured to transmit and receive data to and from the data storage device through a specified communication protocol. The communication protocol may be a wireless communication, or a wired communication. The terminal communicator 59 may be connected to the data storage device by using the data communication circuit via the internet.

The portable terminal device 51 downloads a computer program from the data storage device in response to the terminal controller 53 executing a program acquisition process. The portable terminal device 51 stores the downloaded computer program in the memory 53*b*.

The electric work system 1 is configured such that the data storage device transmits the computer program to the portable terminal device 51, in response to the portable terminal device 51 requesting the data storage device to transmit the computer program.

The computer program includes a sequence of instructions that makes the portable terminal device 51 receive the enabled time from the user of the portable terminal device 51, and transmit the enabled time to the laser marker 10.

Figure 16:
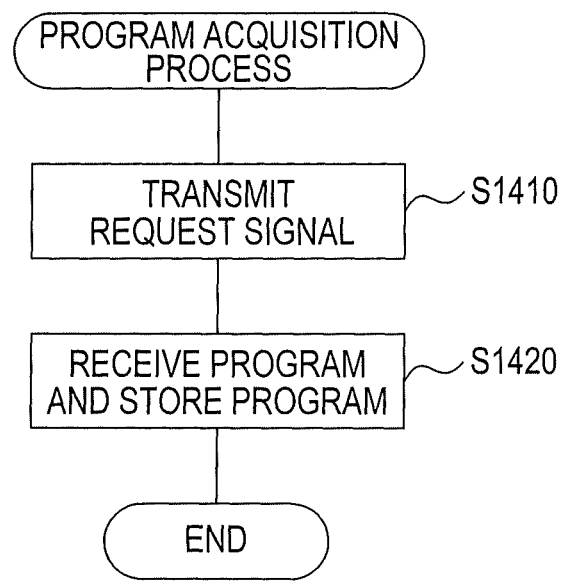
FIG. 16 is a flow chart showing processing details of a program acquisition process.

Description will be given of the program acquisition process with reference to the flow chart of FIG. 16. The flow chart illustrates details of processing executed by the terminal controller 53 of the portable terminal device 51.

The program acquisition process is initiated in response to the user performing a request operation onto the portable terminal device 51. The user performs the request operation by, for example, selecting (or tapping) a "download request" button provided on a specified website. The portable terminal device 51 displays the website on the terminal display 57.

When the program acquisition process is initiated, the terminal controller 53, in S1410, first transmits a program request signal to the data storage device via the terminal communicator 59. The program request signal corresponds to a signal requesting the data storage device to download the computer program.

In the subsequent S1420, the terminal controller 53 receives the computer program from the data storage device via the terminal communicator 59. The terminal controller 53 stores the received computer program in the memory 53*b*.

Upon completion of receiving the computer program, the terminal controller 53 finishes S1420, and then the program acquisition process is terminated.

The computer program may execute the above-described processing. The above-described processing may be, for example, at least one of the auto-lock activation process, the displayed remaining time update process, the timer cancelling process, the enabled time setup process, the password change process, or the service office display process.

1-4. Effect

As described above, the laser marker 10 does not require the user to move thereto in order to make the laser marker 10 disable the laser beam emitting operation and the rotational motion. The laser marker 10 does not require the user to touch the laser marker 10 in order to disable the laser beam emitting operation and the rotational motion, and thus no displacement of the laser marker 10 occurs.

Consequently, the laser marker 10 can reduce a workload for the user to set the laser beam emitter 34 and the motor 36 of the laser marker 10 inoperable.

Subsequently, if the input password SN1 that the laser marker 10 receives (corresponding to the second authentication code of the present disclosure) matches the registered password SNR (corresponding to the password information of the present disclosure), the laser marker 10 enables a reception of the enabled time (corresponding to the permission signal of the present disclosure) from the portable terminal device 51. In this way, the laser marker 10 can limit the operation of the laser beam emitter 34 as well as the operation of the motor 36 based on the enabled time, and thus theft thereof can be deterred.

If the input password SN1 is unmatched with the registered password SNR, the laser marker 10 rejects the reception of the enabled time from the portable terminal device 51. In this way, the laser marker 10 becomes operable without limiting the operation of the laser beam emitter 34 or the operation of the motor 36.

If the input password SN1 is unmatched with the registered password SNR, the device controller 31 transmits the third information signal Sa3 to the portable terminal device 51, to thereby notify that the input password SN1 is unmatched with the registered password SNR. Upon receipt of the third information signal Sa3, the portable terminal device 51 displays the dialog to notify that the input password is wrong (S250). In other words, the electric work system 1 includes a function to notify the user that the passwords are unmatched with each other.

The laser marker 10 can update the enabled time (the permission signal) in accordance with situational changes, even during the measurement of the elapsed time. Accordingly, it is possible to appropriately change the enabled time depending on the situational changes.

The portable terminal device 51 can set the new enabled time into the laser marker 10 via a wireless communication. Therefore, the portable terminal device 51 does not require the user to touch the laser marker 10 in pursuit of deterring theft of the laser marker 10, and thus the workload for the user can be reduced.

The portable terminal device 51 transmits the input password SN1 (the second authentication code) to the laser marker 10 via a wireless communication. Therefore, the portable terminal device 51 does not require the user to touch the laser marker 10 to enter the input password SN1 into the laser marker 10, and thus the workload for the user can be reduced.

The portable terminal device 51 executes the service office display process to display on the terminal display 57, in response to the information button being selected by the user, the contact information of the service office of the service provider of the laser marker 10. This allows the user to easily make a telephone communication to the service office via the portable terminal device 51.

Since the electric work system 1 includes the laser marker 10 and the portable terminal device 51, the workload for the user can be reduced in making the laser beam emitter 34 and the motor 36 of the laser marker 10 inoperable.

The computer program stored in the memory 53*b* makes the terminal controller 53 execute the aforementioned various processes.

For example, the program makes the terminal controller 53 execute each of the auto-lock activation process, the displayed remaining time update process, the enabled time setup process, and the password change process, to thereby make the terminal controller 53 perform a wireless communication step. In the wireless communication step, the terminal controller 53 performs a wireless communication with the laser marker 10 in order to transmit and/or receive various information. The program makes the terminal controller 53 execute S420 and S430 in the enabled time setup process, to thereby make the terminal controller 53 perform an information receiving step through which the enabled time (the permission signal) is received from the user. The program makes the terminal controller 53 execute S440 in the enabled time setup process, to thereby make the terminal controller 53 perform an information transmission step through which the enabled time (the permission signal) is outputted to the laser marker 10.

The program makes the terminal controller 53 execute the wireless communication step, the information receiving step, and the information transmission step, to thereby impart a function for setting the new enabled time into the laser marker 10 via a wireless communication to the portable terminal device 51 including the terminal controller 53. Consequently, the program does not require the user to directly touch the laser marker 10 in pursuit of deterring theft of the laser marker 10, and thus the workload for the user can be reduced.

1-5. Correspondence Between Terms

The device communicator 21 corresponds to one example of an information reception circuit of the present disclosure, and the device controller 31 executing S510 and S530 corresponds to one example of a disabling circuit of the present disclosure. The memory 31*b* corresponds to one example of an authentication code storage device of the present disclosure, and one example of an enabled time storage device permission signal. The device controller 31 executing S170 corresponds to one example of an authentication circuit of the present disclosure. Each of the laser beam emitter 34, the first emitter 5, the second emitter 6, the third emitter 7, and the fourth emitter 8 corresponds to one example of the laser emitter of the present disclosure.

The terminal communicator 59 corresponds to one example of a wireless communication circuit of the present disclosure, and the terminal manipulator 54 corresponds to an information receiving circuit of the present disclosure. The terminal controller 53 executing S150 or S440 corresponds to an information transmission circuit of the present disclosure.

2. Other Embodiments

Embodiments of the present disclosure have been described hereinabove. Nevertheless, the present disclosure is not limited to the aforementioned embodiments. The present disclosure can be embodied in various forms without departing from the spirit of the present disclosure.

(2a) In the aforementioned embodiment, the enabling criterion in S510 is specified as: the remaining time is greater than 0 sec. However, the enabling criterion is not limited to this, and may be, for example, specified as: the remaining time is equal to or greater than 0 sec. If the remaining time is 0 sec, the laser marker in the aforementioned embodiment determines that the enabling criterion is not satisfied in S510. The laser marker, however, may be configured to determine that the enabling criterion is satisfied in S510 by setting the enabling criterion as the remaining time being equal to or greater than 0 sec. The laser marker configured as such maintains a state of enabling the operation, but does not disable the operation, if the remaining time is 0 sec. As time elapses thereafter and the remaining time is less than 0 sec., the enabling criterion is no longer satisfied and therefore the laser marker shifts to a state of disabling the operation.

(2b) In the aforementioned embodiment, a configuration has been described in which the enabled time is stored (S470) first, then the remaining time is updated by subtracting an operating time from the enabled time (S500), and lastly a determination is made on whether the remaining time satisfies a predetermined criterion (S510). However, the present disclosure is not limited to such configuration. Another configuration may be such that, for example, an accumulated operating time that is obtained by accumulating the operating time is counted first, then the remaining time is calculated by subtracting the current accumulated operating time from the enabled time that is initially stored, and lastly a determination is made on whether the remaining time satisfies the predetermined criterion.

(2c) In the aforementioned embodiment, the smartphone has been described as one example of the portable terminal device. The portable terminal device, however, may be in the form of a tablet device, a laptop computer, or the like.

(2d) In the aforementioned embodiment, descriptions have been given of the first wireless communication between the laser marker 10 and the portable terminal device 51 by reference to one example of the communication protocol that conforms to the standard for Bluetooth. However, the first wireless communication is not limited to such protocol. A communication protocol, such as Wi-Fi (Registered Trademark), may be used for the first wireless communication.

(2e) Two or more functions achieved by a single element in the aforementioned embodiments may be achieved by elements, or a function achieved by elements may be achieved by a single element. In addition, at least portion of a configuration in one of the aforementioned embodiments may be substituted by a well-known configuration having the similar functions. In addition, portion of the configuration of each embodiment above may be omitted. Moreover, at least portion of an element in one of the aforementioned embodiments may be added to, or may be replaced by, another one of the aforementioned embodiments. Any modes within the scope of the technical ideas identified from the claim language are embodiments of the present disclosure.

What is claimed is:

1. A laser marker comprising:
   a laser emitter configured to emit a laser beam, the laser beam indicating a reference line;
   an information reception circuit configured to receive an enabled time via wireless communication, the enabled time specifying a time-period during which the laser marker is enabled to operate; and
   a disabling circuit configured to lock the laser marker inoperable in response to the enabled time received by the information reception circuit having elapsed.

2. The laser marker according to claim 1,
   wherein the disabling circuit is configured to enable the laser marker to operate in response to the enabled time not having elapsed.

3. The laser marker according to claim 1, further comprising a motor configured to generate a rotational force, wherein the laser emitter is directly or indirectly rotatably coupled to the motor.

4. The laser marker according to claim 1,
   wherein the laser beam includes a horizontal laser beam indicating a horizontal reference line, or a vertical laser beam indicating a vertical reference line.

5. The laser marker according to claim 1, wherein:
   the information reception circuit is configured to receive the enabled time from an external device via the wireless communication; and
   the external device is distinct from a beam receiving device that is configured to receive the laser beam emitted from the laser emitter.

6. The laser marker according to claim 5, wherein the external device is a portable terminal device.

7. A laser marker comprising:
   a laser emitter configured to emit a laser beam, the laser beam indicating a reference line;
   an information reception circuit configured to receive an enabled time via wireless communication, the enabled time specifying a time-period during which the laser marker is enabled to operate;
   a disabling circuit configured to disable the laser marker for operating in response to the enabled time received by the information reception circuit having elapsed;
   an authentication code storage device configured to store a first authentication code, or storing the first authentication code, the first authentication code being assigned to the laser marker, the first authentication code including a string of characters, numbers, and/or symbols for enabling a use of the laser marker; and
   an authentication circuit configured to authenticate, based on the first authentication code, an external device that is connected to the laser marker via the wireless communication,
   wherein the information reception circuit is configured to receive a second authentication code from the external device via the wireless communication,
   wherein the second authentication code is inputted into the external device by a user of the external device, and
   wherein the authentication circuit is configured to permit the external device to transmit the enabled time to the laser marker in response to the second authentication code corresponding to the first authentication code.

8. The laser marker according to claim 7,
   wherein the authentication circuit is configured to prohibit the external device from transmitting the enabled time to the laser marker in response to the second authentication code not corresponding to the first authentication code.

9. A laser marker comprising:
   a laser emitter configured to emit a laser beam, the laser beam indicating a reference line;
   an information reception circuit configured to receive an enabled time via wireless communication, the enabled time specifying a time-period during which the laser marker is enabled to operate;
   a disabling circuit configured to disable the laser marker for operating in response to the enabled time received by the information reception circuit having elapsed; and
   an enabled time storage device configured to store the enabled time that is received by the information reception circuit,
   wherein the enabled time storage device is configured to update the enabled time stored in the enabled time storage device, in response to the information reception circuit receiving the enabled time, with the enabled time received, and wherein the disabling circuit is configured to determine whether a length of the time having elapsed is reaching or has reached a length of the enabled time based on the enabled time stored in the enabled time storage device.

\* \* \* \* \*